United States Patent [19]

Boswell, Jr. et al.

[11] 3,919,204

[45] Nov. 11, 1975

[54] FLUORINATED CEPHALOSPORINS

[75] Inventors: George A. Boswell, Jr.; David R. Brittelli, both of Wilmington, Del.

[73] Assignee: E. I. Du Pont de Nemours & Company, Wilmington, Del.

[22] Filed: Dec. 11, 1972

[21] Appl. No.: 314,024

[52] U.S. Cl. ............ 260/243 C; 424/246; 260/239.1
[51] Int. Cl.² .................................. C07D 501/20
[58] Field of Search ............................ 260/243 C

[56] References Cited
UNITED STATES PATENTS

| | | | |
|---|---|---|---|
| 3,544,581 | 12/1970 | Essery | 260/243 C |
| 3,705,892 | 12/1972 | Cooper | 260/243 C |
| 3,705,897 | 12/1972 | Murphy | 260/243 C |

*Primary Examiner*—Nicholas S. Rizzo
*Attorney, Agent, or Firm*—Anthony P. Mentis

[57] ABSTRACT

Cephalosporins having 2 or 3 fluorine atoms on the 3-methyl carbon are active antibiotics.

39 Claims, No Drawings

FLUORINATED CEPHALOSPORINS

BACKGROUND OF THE INVENTION

1. Field of the Invention

This invention relates to novel compounds having the cephem nucleus and having 2 or 3 fluorines on the methyl side chain at the 3-position and their preparation.

2. Description of Prior Art

In general, cephalosporins are antibiotics related to penicillin except that the cephalosporins are often effective against penicillin resistant organisms. They have drawbacks, however, in having lower oral absorption and lower activity and various attempts have been made to improve these properties through chemical modification of the cephalosporin molecule.

The cephalosporin C nucleus can be named as 1-thia-5-aza-6R-bicyclo[4,2,0]octan-8-one, although cepham or cephem (for $\Delta^2$ or $\Delta^3$-unsaturate) is simpler and easier to use for the compounds. The structure of cephalosporanic acid is

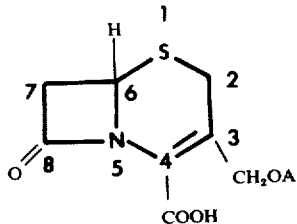

A halogen derivative, 3-bromomethyl (prepared by N-bromosuccinimide on 3-methyl cephem)has been proposed in South African Pat. No. 6,900,761. Other recently issued patents such as Netherlands Pat. No. 7,004,479 and French Pat. No. 1,589,109 disclose 3-halomethyl derivatives where the halogen is specified as Cl, Br or I. Recent West German Pat. No. 2,052,531 appears to disclose the monofluoro derivative but does not give any method or fluorine-containing reagents whereby such monofluoro derivative would be obtainable. It is widely recognized that properties and synthetic methods for preparing fluoro compounds are quite different than for the other halogens. No mention is made in the art of polyhalo derivatives, much less the difluoromethyl compound.

The cephalosporin ring system includes a β-lactam ring fused to nitrogen of a thiazine ring system. Some of these ring systems are unstable to hydrolysis and fluorination conditions. Furthermore polyhalogen derivatives are generally hydrolytically unstable and it is not surprising that in this field of antibiotic transformations no processes have been suggested for fluorination of cephalosporins.

DESCRIPTION OF THE INVENTION

The invention embraces a fluorinated cephalosporin compound of the formula:

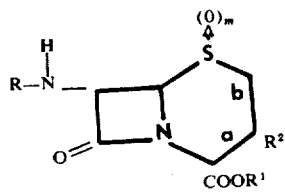

wherein:

$m$ is zero or 1;

$a$ and $b$ are either a single or double bond with the proviso that $b$ is a double bond only when $m = 0$ and $a$ is a single bond;

R is H or

in which Q has up to 8 carbon atoms and is hydrocarbyl, amino-substituted hydrocarbyl or heterocyclic group;

$R^1$ is H, hydrocarbyl of up to 13 carbon atoms or polychloro hydrocarbyl, alkali metal, alkaline earth metal, ammonium or amine salt; and $R^2$ is $CHF_2$, $CF_3$ or COF. It is to be understood that when $a$ is a single bond and $b$ is a double bond there is a hydrogen atom on each of the number 2 and 4 carbon atoms in the ring. When $a$ is a double bond and $b$ is a single bond there are two hydrogen atoms on the number 2 carbon atom.

The invention also includes pharmaceutically acceptable acid addition salts of the compounds, where for example, R is H. Such salts include the hydrochloride, sulfate, nitrate, phosphate, acetate, tartrate and citrate, etc.

Specific examples of Q are 2-thienylmethyl, 3-[1,2,5-thiadiazolyl]methyl, phenylmethyl, 3-[2,5,6-tricyanopyrazinyl]methyl and furfurylmethyl. Examples of $R^1$ are diphenylmethyl and 2,2,2-trichloroethyl as well as hydrogen, alkalii metal, e.g., sodium or potassium; alkaline earth, e.g., calcium; ammonium or amine salts, e.g., trimethylammonium, N-methylpiperidine, etc.

Particularly preferred are 3-difluoromethylcephalosporins since these products are especially useful as antibacterials.

The new fluorine-containing cephalosporin derivatives are obtained by fluorination under anhydrous conditions of 3-oxygen-containing, including 3-aldehyde or 3-carboxy cephalosporins by a fluorinating reagent of the formula $R^3SF_3$ where $R^3$ is F, aryl or a diprimaryalkylamino group, the alkyls having up to 4 carbon atoms. The reaction is generally conducted under relatively mild conditions, e.g., from −80°C. to +75°C., preferably 0° to 35°C., whereby oxygen of the 3-oxy group is replaced by fluorine without substantial reaction with other oxygen groups in the cephalosporin. When the starting material contains a 3-aldehyde group the fluorination process yields a compound where $R^2$ is $CHF_2$. When the starting material contains a 3-carboxy group, the fluorination process yields a compound where $R^2$ is $CF_3$. When $SF_4$ is used as the fluorinating agent, some material is also produced where $R^2$ is COF.

The diprimaryalkylaminosulfur trifluorides are known compounds. In general they are prepared by the reaction of a dialkylaminotrimethylsilane with sulfur tetrafluoride at a low temperature in an inert solvent, see Halasz et al., Chem. Ber. 103, 594–602 (1970). Examples are dimethylaminosulfur trifluoride, diethylaminosulfur trifluoride, dipropylaminosulfur trifluoride and dibutylaminosulfur trifluoride.

The following sections show the sequence of steps useful in producing the compounds.

A. PREPARATION OF 3-DIFLUOROMETHYLCEPHEMS
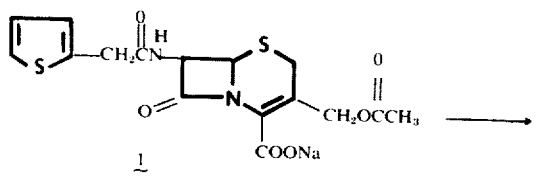
1
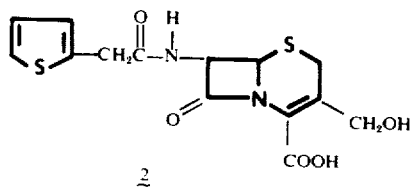
2
2 → 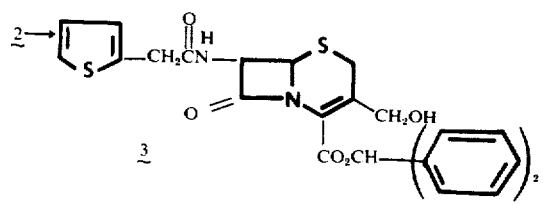
3
3 → 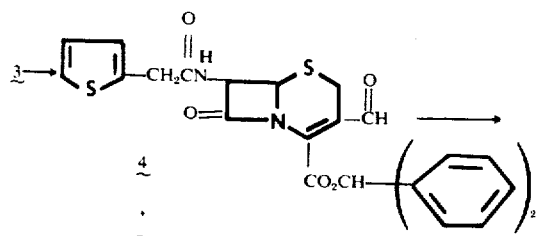
4
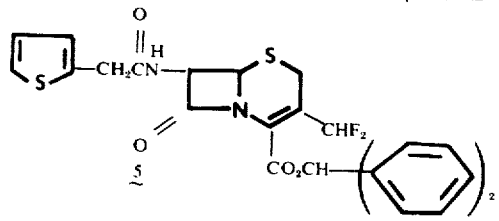
5
5 → 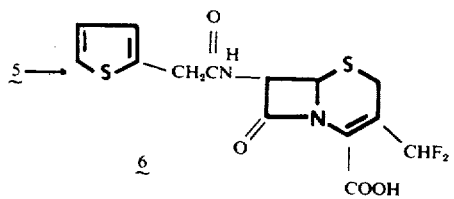
6
3 → 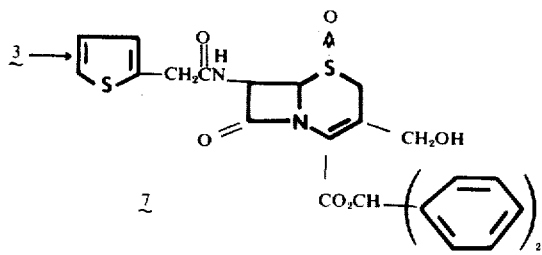
7

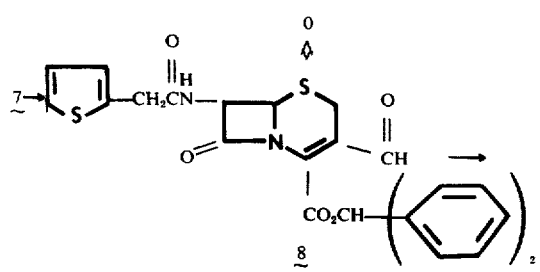
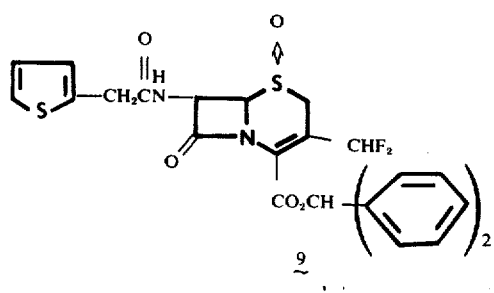
9 → 5
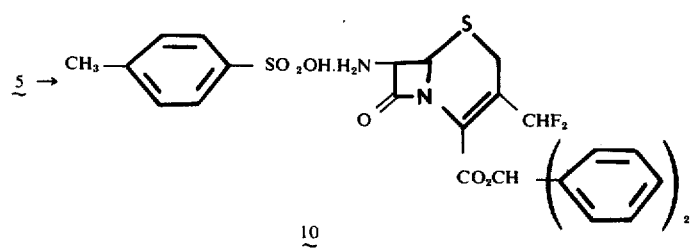
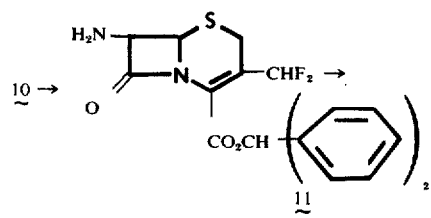
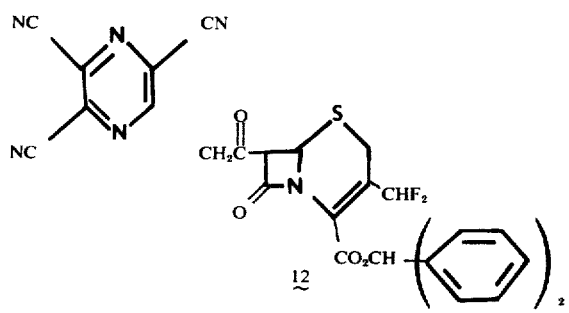
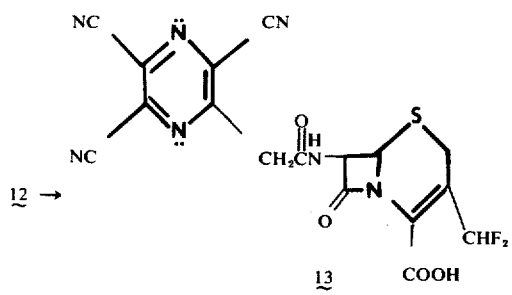

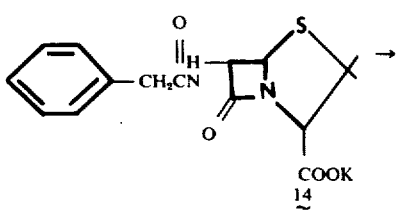
14
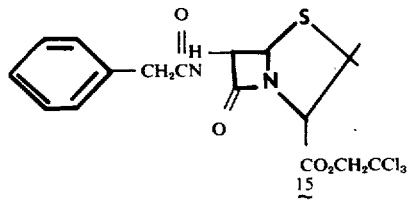
15
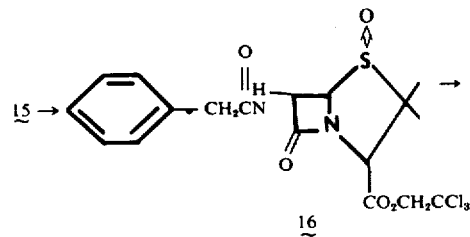
16
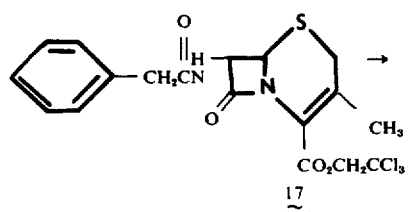
17
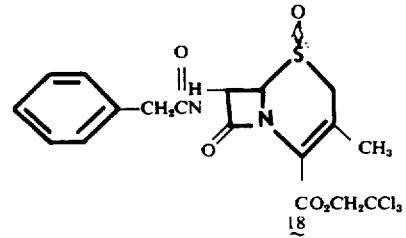
18
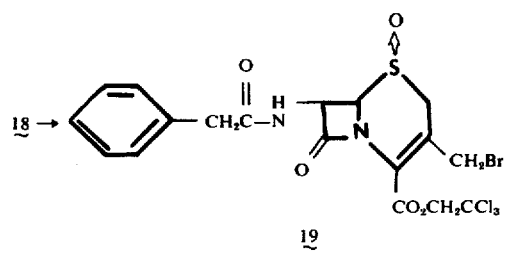
19
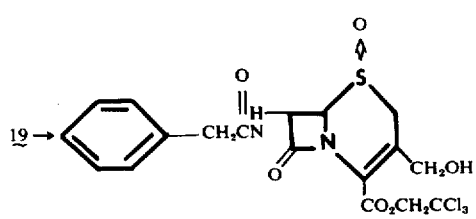
20

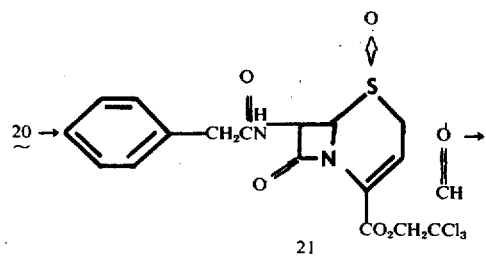
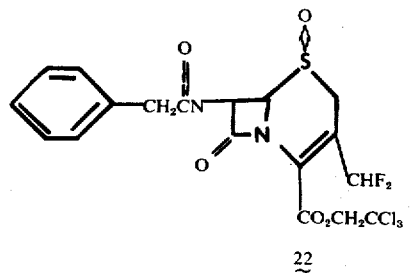
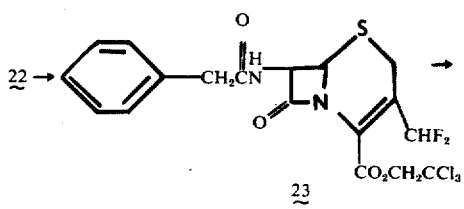
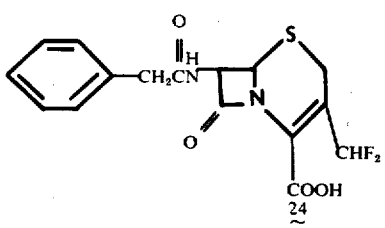
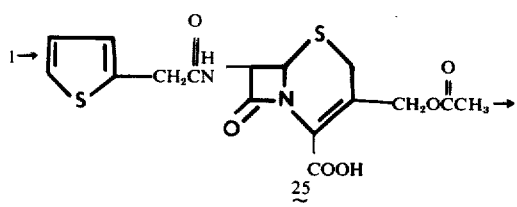
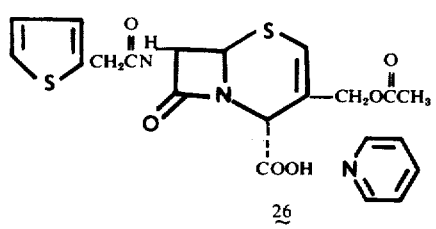
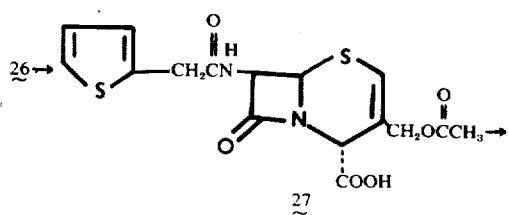

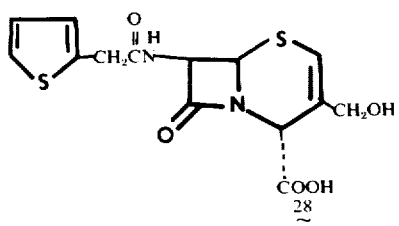
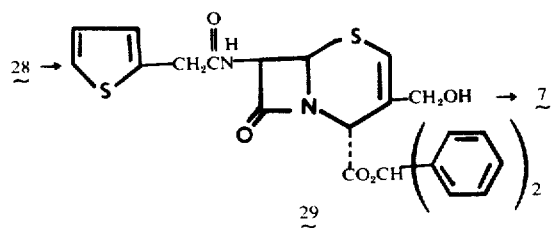
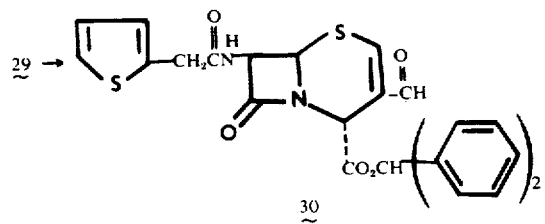
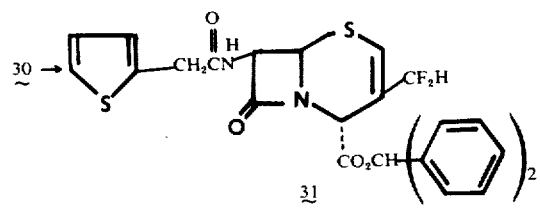
B. PREPARATION OF
3-TRIFLUOROMETHYLCEPHEMS AND
3-ACYLFLUORIDECEPHEMS
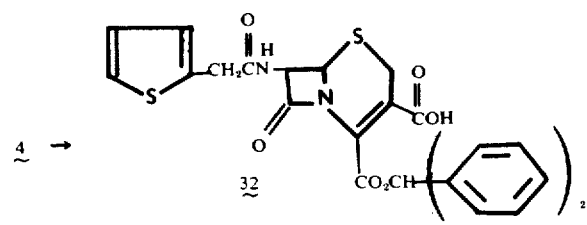
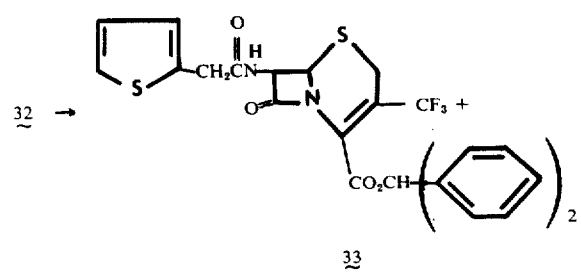

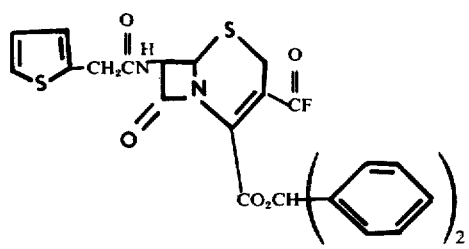
34
33 → 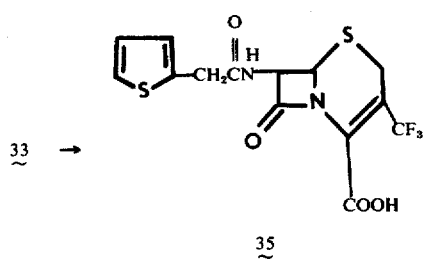
35
8 → 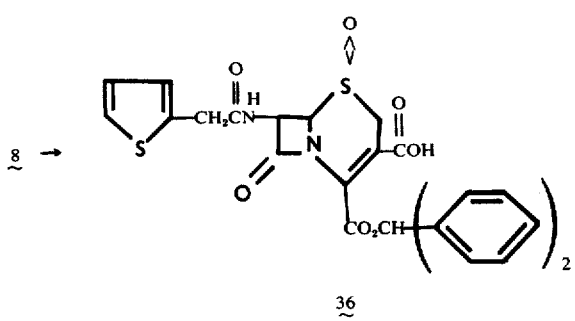
36
36 → 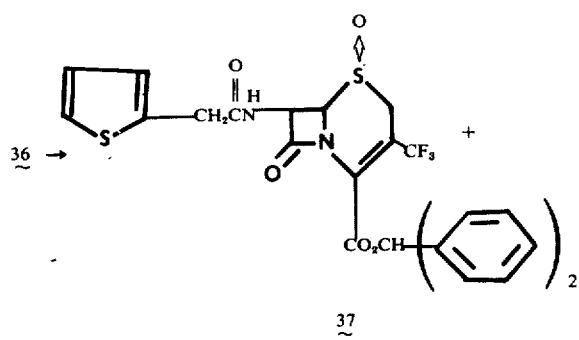 +
37
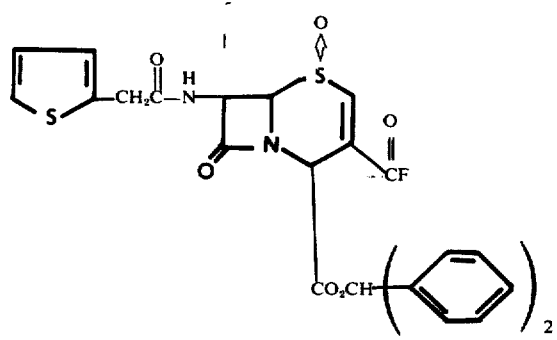
38

37 →
33 →
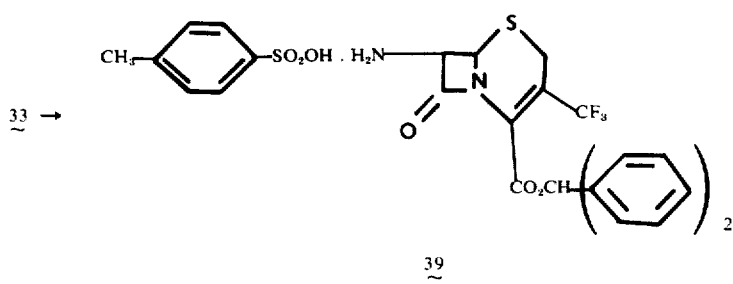
39 →
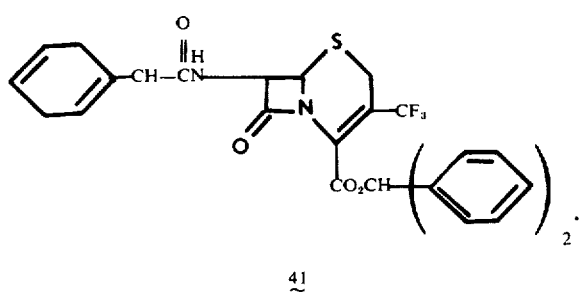
41 →
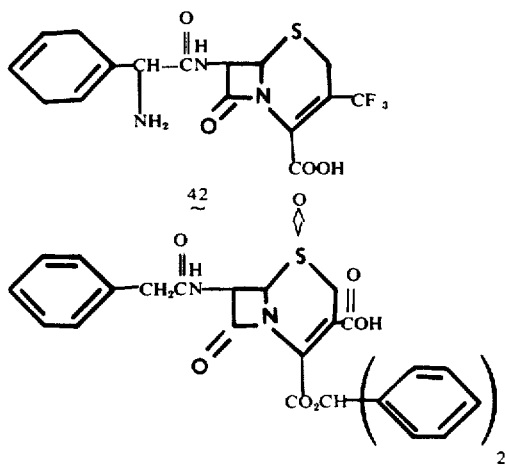
21
43
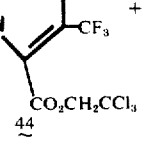

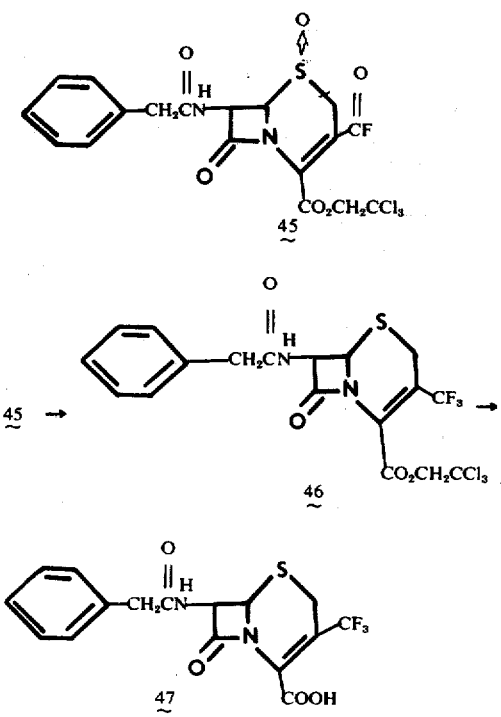

SPECIFIC EMBODIMENTS OF THE INVENTION

In the illustrative examples below all temperatures are in degrees Centigrade and all parts are by weight unless otherwise stated.

PART A

Example 1

A1. Preparation of 3-Hydroxymethyl-7-(2-thienylacetamido-3-cephem-4-carboxylic Acid (2).

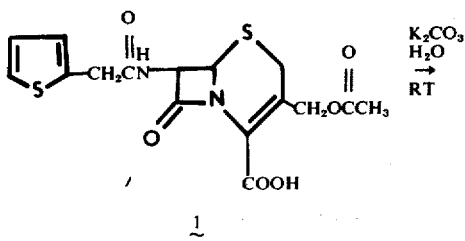

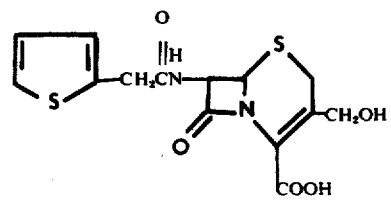

This substance was prepared according to German Pat. No. 2,103,014. A suspension of 8.0 g of cephalothin (1) in 120 ml $H_2O$ was treated with 8.6 g $K_2CO_3$ and the resulting solution was stirred at 36° for 4.25 hrs., then at 30° for 18 hrs. The resulting mixture was layered with 500 ml ethyl acetate and a solution of 10.0 ml conc. HCl in 50 ml $H_2O$ was added. The ethyl acetate was dried ($MgSO_4$) and removed in vacuo in yield 3.84 g (54%) of 3-hydroxymethyl-7-(2-thienylacetamido)-3-cephem-4-carboxylic acid, mp 138°–145°d. Crystallization from ethyl acetate yielded material, mp 149°–151°D (lit. mp 151.5°–152°d); ir (nujol mull): 3600–2400 (carboxyl —OH), 3450

(amide N—H), 1790 (β-lactam C=O), 1745 (acid C=O), 1650 (amide C=O), and 1510 ("amide II" band) cm$^{-1}$.

A2. Preparation of Benzhydryl 3-Hydroxymethyl-7-(2-thienylacetamido)-3-cephem-4-carboxylate (3).

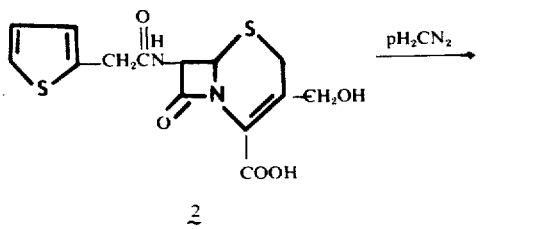

2

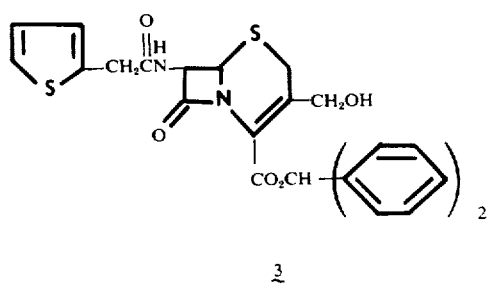

3

Using the procedure outlined in German Pat. No. 2,103,014, a solution of 3.84 g of the preceding acid in 150 ml of tetrahydrofuran was added to 2.6 g of diazodiphenylmethane. Gas evolution started immediately. The mixture was allowed to stir at 25° for 64 hrs, then stripped in vacuo and triturated with ether to yield 6.38 g of benzhydryl 3-hydroxymethyl-7-(2-thienylacetamido)-3-cephem-4-carboxylate, mp 116°–138°d (lit mp 169–170°d); ir (CHCl$_3$); 3500 (—OH), 1790 (β-lactam C=O), 1735 (ester C=O), 1670 (amide C=O), 1500 ("amide II" band), and 690 (monosubstituted benzene) cm$^{-1}$, nmr (dmso-d$_6$): δ 3.22 (2, s, C$_2$—CH$_2$), 3.92 (2, s, α-thienyl-CH$_2$), 4.17 (1, s (broad), —OH) 4.78 (2, s, C$_3$—CH$_2$) 5.08 (1, d (J = 5 Hz), C$_6$—H), 5.77 (1, m, C$_7$—H), 6.88 (1, s, —CHPh$_2$), 6.92 (2, d (J = 3 Hz), thiophene 3- and 5-H's), 7.31 (11, s (broad), aromatic and thiophene 4-H), and 9.01 (1, d (J = 10 Hz), amide N—H).

Anal. Calcd. for C$_{27}$H$_{24}$N$_2$O$_5$S$_2$: C, 62.31; H, 4.65 N, 5.38. Found: C, 62.50; H, 4.85; N, 5.33.

A3. Preparation of Benzhydryl 3-Formyl-7-(2-thienylacetamido)- 3-cephem-4-carboxylate (4).

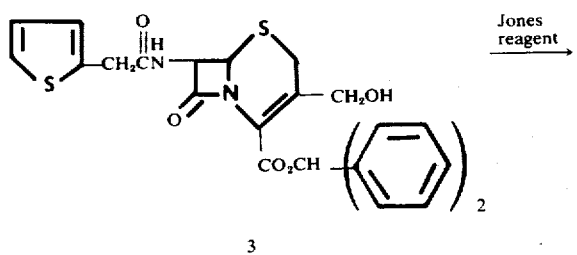

3

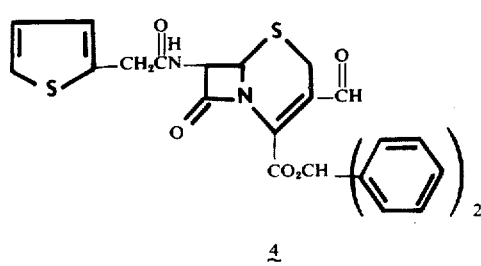

4

As described in German Pat. No. 2,103,014, a solution of 3.3 g of benzhydryl 3-hydroxymethyl-7-(2-thienylacetamido)3-cephem-4-carboxylate (3) in 150 ml acetone was cooled to 0° and 1.90 ml of 8N CrO$_3$ in H$_2$SO$_4$ (Jones reagent) was added in 0.10 ml increments over the period of 5.0 min. The resulting mixture was stirred for 40 min. at 0°, then an additional 0.30 ml of oxidant was added. The mixture was stirred an additional 10 min, then poured into 450 ml satd. NaCl layered with 300 ml ethyl acetate. The organic layer was washed with water, dried (MgSO$_4$), and stripped in vacuo. The resulting residue was chromatographed on silica with benzene, then 4:1 benzene ethyl acetate to yield 0.564 g of benzhydryl 3-formyl-7-(2-thienylacetamido)-3-cephem-4-carboxylate; ir (CHCl$_3$): 3400 (amide N—H), 2720 (aldehyde H), 1810 (β-lactam C=O), and 1507 ("amide II" band) cm$^{-1}$; uv max (C$_2$H$_5$OH): 298 nm (7750, 335 nm (7250), and 450 nm (620); nmr (CDCl$_3$); δ 3.17 and 3.90 (AB, 2 (J$_{AB}$ = 19 Hz), C$_2$—CH$_2$), 3.95 (s, 2, α-thienyl CH$_2$), 4.91 (D, 1 (J = 5 Hz), C$_6$—H), 5.92 (dd, 1 (J = 5 Hz, J' = 10 Hz), C$_7$—H, 7.03 (s, 1, —CO$_2$CHPh$_2$), 7.31 (m, 13, phenyl & thiophene —H), 6.78 (d, 1 (J = 10 Hz), amide N—H), and 9.60 (s, 1, aldehyde —H).

A4. Preparation of Benzhydryl 3-Difluoromethyl-7-(2-thienylacetamido)-3-cephem-4-carboxylate (5).

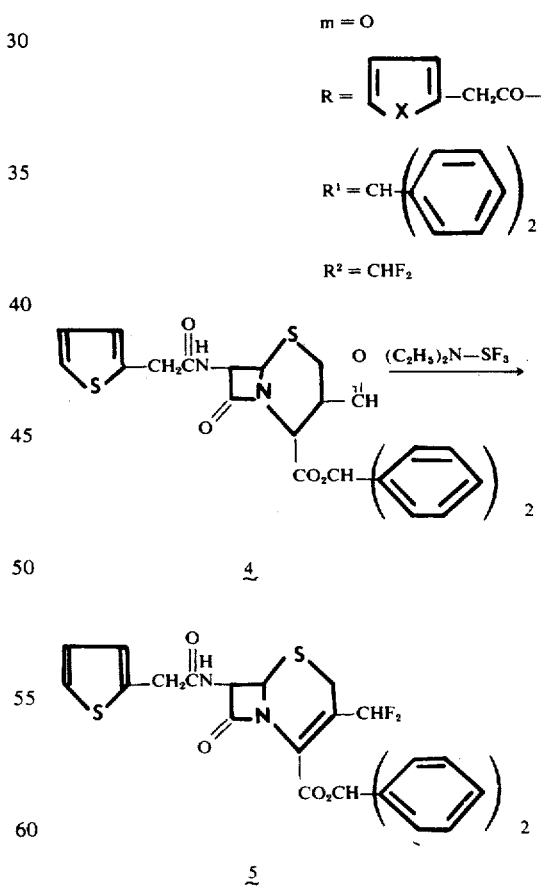

A solution of 0.518 g of benzhydryl 3-formyl-7-(2-thienylacetamido)-3-cephem-4-carboxylate and 1.0 ml of diethylaminosulfur trifluoride in 25 ml CH$_2$Cl$_2$ was stirred at 27° for 2.0 hrs and then poured into 25 ml of water. The CH$_2$Cl$_2$ phase was dried (MgSO$_4$) and stripped in vacuo. The residue was chromatographed on silica with CHCl$_3$ to yield 0.264 g (49%) of a 1:1 mixture of Δ³: Δ² benzhydryl 3-difluoromethyl-7-(2-thienylacetamido)-cephem-4-carboxylates; ir (CHCl₃) 3450 (amide N—H), 1820 (β-lactam C=O), 1750 (ester C=O), 1695 (amide C=O), and 1510 ("amide II" band) cm⁻¹; ¹⁹F nmr (CHCl₃) δ 116.43 (d ($J_{HF}$ = 57 Hz), —CHF₂ (one of Δ² + Δ³ isomers)) and 115.82 (d($j_{HF}$ = 57 Hz), —CHF₂ (other isomer)), 3.74 (2, s, thienyl —CH₂), 4.94 (1, d(J = 6 Hz), C₆—H), 5.91 (1, dd (J = 6 Hz, J' = 10 Hz), C₇—H), 6.72 (1, t ($J_{HF}$ = 57 Hz), —CHF₂), and 7.3 (13, m, aryl + thiphene —H); uv max (C₂H₅CH) 265 (7400).

Anal. Calcd. for $C_{27}H_{22}N_2O_4S_2F_2$: C, 59.99; H, 4.10; N, 5.18. Found: C, 59.82; H, 3.94; N, 5.01

Example 2

A5. 3-Difluoromethyl-7-(2-thienylacetamido)-3-cephem-4-carboxylic Acid (23)

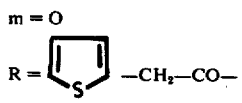

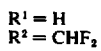

R¹ = H
R² = CHF₂

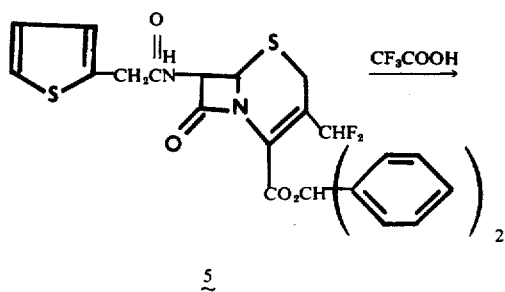

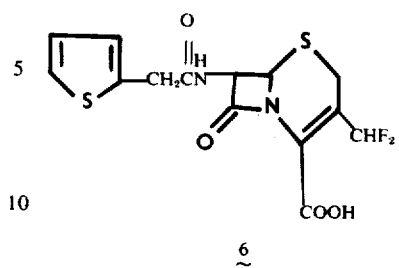

To 0.190 g of benzhydryl 3-difluoromethyl-7-(2-thienylacetamido)-cephem-4-carboxylate (a mixture of Δ² and Δ³ isomers) was added 0.25 ml of anisole and 1.0 ml of trifluoroacetic acid and the mixture was swirled at 27° for 5 min, then evaporated in vacuo. The residue was taken up in ethyl acetate and extracted with 5% NaHCO₃ solution. The NaHCO₃ solution was washed once with ethyl acetate, then brought to pH3 by the addition of dilute HCl and extracted with ethyl acetate. This ethyl acetate solution was dried (MgSO₄) and evaporated in vacuo to yield 0.103 g (79%) of a 3:1 mixture of Δ² :Δ³ 3-difluoromethyl-7-(2-thienylacetamido)-cephem-4-carboxylic acids, which was purified for analysis by crystallization from ethyl acetatepentane; ir (KBr pellet) 3650–2500 (carboxyl—OH), 1770 (β-lactam C=O), 1725 (carboxyl C=O), 1675 (amide C=O), and 1525 (" amode II" band) cm⁻¹; uv max (C₂H₅OH) 235 nm (10,500) and 265 nm (4900).

Anal. Calcd. for $C_{14}H_{12}H_2O_4S_2F_2$: C, 44.91; H, 3.23; N, 7.43. Found: C, 44.61; H, 3.51; N, 7.23.

Example 3

A6. Preparation of Benzhydryl 3-Hydroxymethyl-7-(2-thienylacetamido)-3-cephem-4-carboxylate-1-oxide (7)

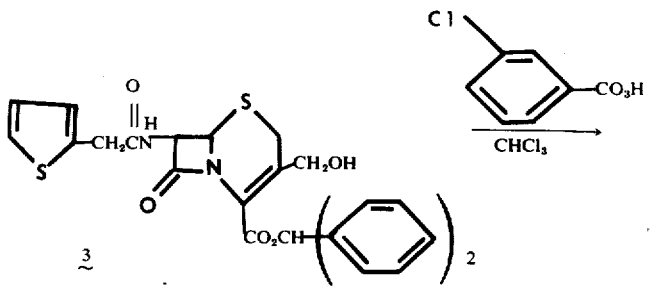

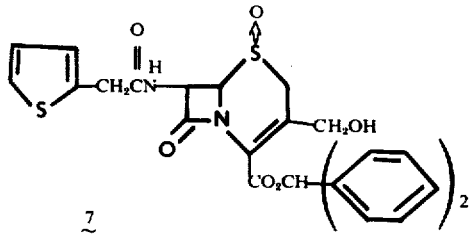

To a solution of 16 g of crude hydroxy ester (obtained as in A2 above) in 75 ml CHCl₃ at 0° was added dropwise a solution of 2.9 g of m-chloroperbenzoic acid in 50 ml of CHCl₃. The resulting solution was stirred 3 hrs at 0°, then washed with 5% NaHCO₃, dried (MgSO₄), and stripped in vacuo. The residue was dissolved in boiling methanol and the methanol was removed in vacuo. The resulting material was chromatographed on silica with CHCl₃, then 4:1 CHCl₃/ethyl acetate, and finally ethyl acetate, giving 4.5 g of benzhydryl 3-hydroxymethyl-7-(2-thienylacetamido)-3-cephem-4-carboxylate-1-oxide, mp 175.5-176.5° d; ir (CHCl₃): 3550 (OH), 1795 (β-lactam C=O), 1720 (ester C=O), 1660 (amide C=O), 1495 ("amide II" band), and 1040 (sulfoxide) cm⁻¹; nmr (dmso-d₆): δ 3.68 (2, m, C₂—H), 3.82 (2, s, thienyl-CH₂), 4.29 (2, d (J = 5 Hz), C-3-CH₂OH), 4.86 (1, d (J = 5 Hz), C₆—H), 5.88 (1, dd (J = 5 Hz, J' = 8 Hz), C₇—H), 6.82 (1, s, —OCHPh₂), 6.93 (2, d (J = 3.0) Hz), thiophene 3- and 5-H), and 8.32 (11, m, phenyl and thiophene 4-H).

Anal. Calcd. for C₂₇H₂₄N₂O₆S₂: C, 60.45; H, 4.51; N, 5.22. Found: C, 60.32; H, 4.62; N, 4.97.

A7. Preparation of Benzhydryl 3-formyl-7-(2-thienyl-acetamido)-3-cephem-4-carboxylate-1-oxide (8).

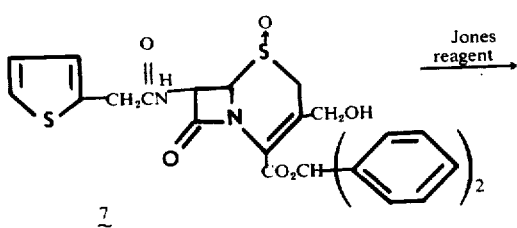

As described in Belgian Patent 770,531, to a solution of 1.80 g (3.4 mmole) of benzhydryl 3-hydroxymethyl-7-(2-thienylacetamido)-3-cephem-4-carboxylate-1-oxide in 100 ml of acetone at 0° was added over the period of 2 min 0.90 ml of 8N CrO₃ in H₂SO₄ and the mixture was stirred at 0° for 5 min, then poured into a mixture of 300 ml ethyl acetate and 300 ml of water and the ethyl acetate layer was washed with water, dried (MgSO₄) and evaporated in vacuo. The residue was chromatographed on silica with CHCl₃ to yield 0.716 g of benzhydryl 3-formyl-7-(2-thienylacetamido)-3-cephem-4-carboxylate-1-oxide after crystallization from methanol; uv max (C₂H₅OH): 269 nm (4600), 292 nm (4300), and 355 nm (1760); nmr (dmso-d₆): 3.75 and 4.32 (AB, 2 (J_{AB} = 19 Hz), C₂—CH₂), 3.88 (s, 2, α-thienyl CH₂), 5.08 (d, 1 (J = 5 Hz), C₆-H), 6.18 (dd, 1 (J = 5 Hz, J' = 8.5 Hz), C —H), 7.17 (1, s, -CO₂CH Ph₂), 7.02 (d, 2 (J = 3.0 Hz), thiophene 3- and 5-H), 7.44 (10, s, phenyl-H), 8.72 (d, 1 (J = 8.5 Hz), amide N—H), and 9.85 (s, 1, aldehyde-H).

A8. Benzhydryl 3-Difluoromethyl-7-(2-thienylacetamido)-3-cephem-4-carboxylate-1-oxide (9)

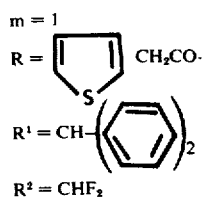

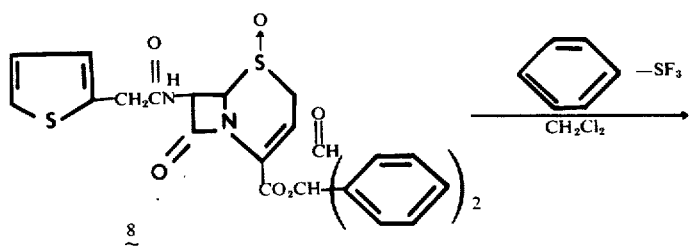

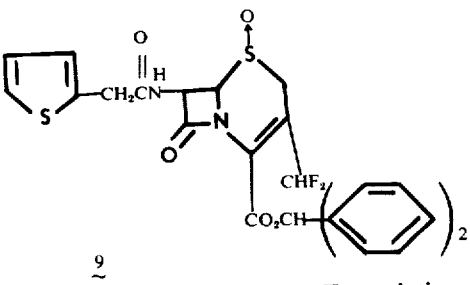

To a solution of 0.498 g (2.1 mmoles) of phenylsulfur trifluoride in 20 ml of CH₂Cl₂ at −25° under N₂ is added dropwise with stirring a solution of 1.12 g (2.1 mmoles) of benzhydryl 3-formyl-7-(2-thienylacetamido)-3-cephem-4-carboxylate-1-oxide in 20 ml of CH₂Cl₂. The mixture is stirred at −25° for 0.5 hr. then poured into 100 ml of water and extracted with CH₂Cl₂. The CH₂Cl₂ layer can be separated, dried (MgSO₄), and evaporated in vacuo. Chromatography on silica gel with 1:1 cyclohexane/ethyl acetate gives benzhydryl 3-difluoromethyl-7-(2-thienylacetamido)-3-cephem-4-carboxylate-1-oxide.

Example 4

A9. Benzhydryl 3-Difluoromethyl-7-(2-thienylacetamido)-3-cephem-4-carboxylate (5).

carboxylate-1-oxide (9) in 10 ml CH₃CN and 3 ml DMF at 0° is added 0.455 g (2.4 mmole) anhydrous SnCl₂ and 0.70 g (9.0 mmole) acetyl chloride and the resulting mixture stirred at 0° for 1.0 hr, then at 25° for 1.0 hr, and then poured into water and extracted with ethyl acetate. The ethyl acetate layer when washed with 3% HCl solution, 5% NaHCO₃ solution, water, then dried (MgSO₄) and stripped in vacuo gives the compound, which can be purified by the method outlined in A4 above.

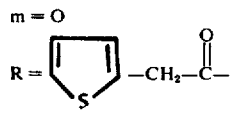
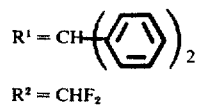

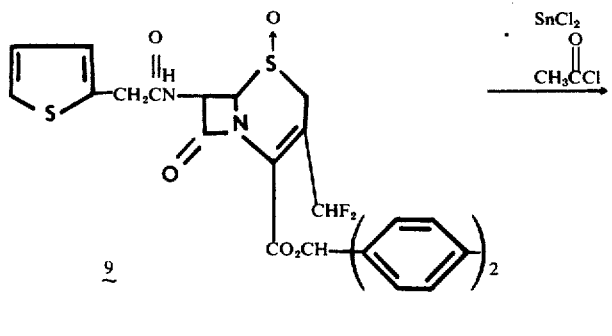

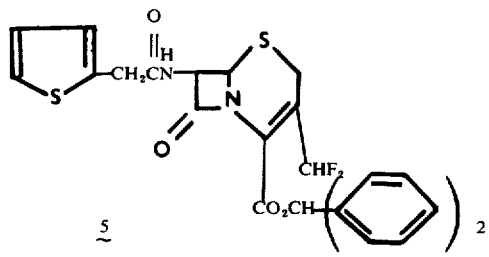

The compound 5 can also be made as follows:

To a solution of 1.22 g (2.2 mmole) of benzhydryl 3-difluoromethyl-7-(2-thienylacetamido)-3-cephem-4-

Example 5

A10. Benzhydryl 7-Amino-3-difluoromethyl-3-cephem-4-carboxylate p-toluenesulfonic acid salt (10)

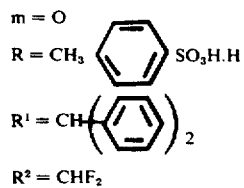

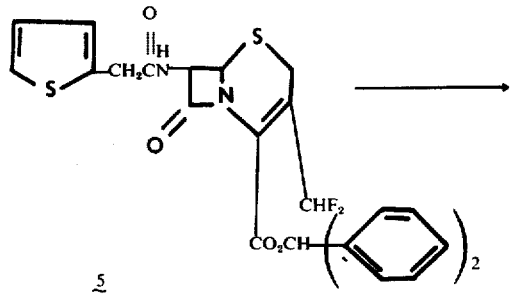

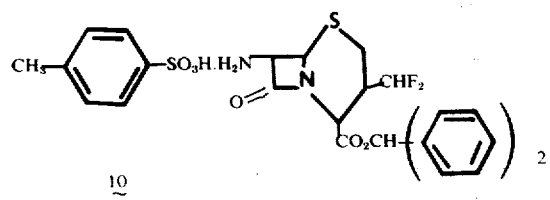

10

This salt can be made as follows: A solution of 1.65 g (3.2 mmole) of benzhydryl 3-difluoromethyl-7-(2-thienylacetamido)-3-cephem-4-carboxylate in 35 ml $CCl_4$ is cooled to below −25° in a 200 ml-3-necked round bottom flask fitted with thermometer and mechanical stirrer and under $N_2$. Then 0.70 ml of N-ethyl morpholine is added and the mixture was stirred at −25° while a suspension of 0.7g of $PCl_5$ in 15 ml of dry $CCl_4$ is added over the period of 25 min. through a solid addition adapter. The resulting mixture is stirred at 0° for 30 min., then cooled to below −25° again and treated with 0.70 ml of N-ethyl morpholine in 25 ml of dry methanol. This solution is stirred at 0° for 2 hrs and then poured into 50 ml of $H_2O$ in a separatory funnel and the pH adjusted to just over 7 (just lime green to pH paper) by the addition of conc. NaOH solution. After shaking, the $CCl_4$ layer is separated, dried ($MgSO_4$), and added to a solution of 0.56 g of p-toluenesulfonic acid hydrate in 15 ml of ethyl acetate. The resulting solution when allowed to stand in a cold room for a few days gives a crystalline p-toluenesulfonic acid salt a benzhydryl 7-amino-3-difluoromethyl-3-cephem-4-carboxylate.

Example 6

A11. Benzhydryl 7-Amino-3-difluoromethyl-3-cephem-4-carboxylate (11).

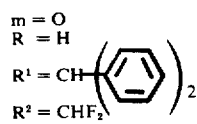

m = O
R = H
$R^1$ = CH-(⟨⟩)$_2$
$R^2$ = $CHF_2$

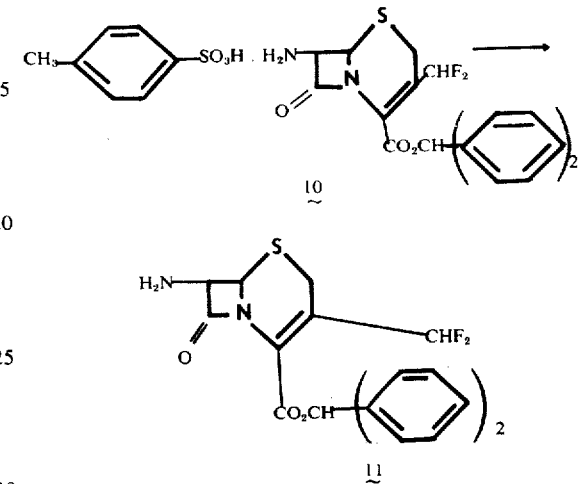

The preceding salt can be converted to the free base as follows:

To a suspension of 3.4 g of the p-toluenesulfonic acid salt of benzhydryl 7-amino-3-difluoromethyl-3-cephem-4-carboxylate in 100 ml of ether 100 ml of water is added. The pH is adjusted to 7 by the addition of 5% aq. $K_2CO_3$ solution, and the ether layer separated, filtered to remove insoluble material, and dried over $MgSO_4$. Removal of the ether in vacuo gives the amino ester 11 used without purification in procedure 12 below.

Example 7

A12. Benzhydryl 3-Difluoromethyl-7-(3-[2,5,6-tricyanopyrazinyl]acetamido)-3-cephem-4-carboxylate (12).

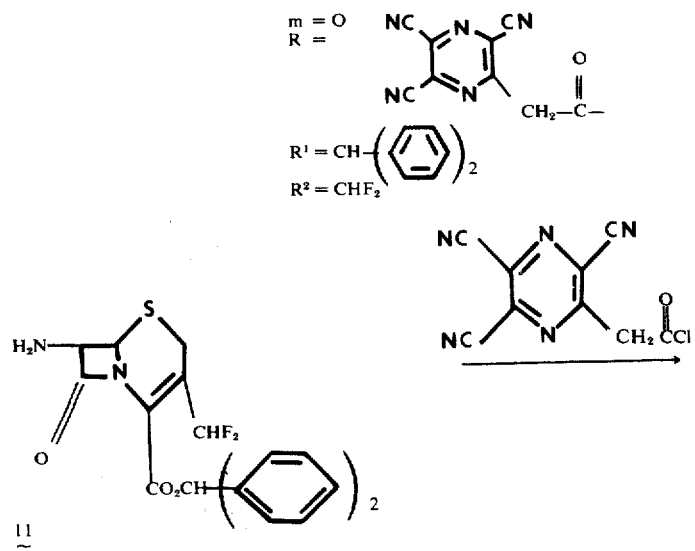

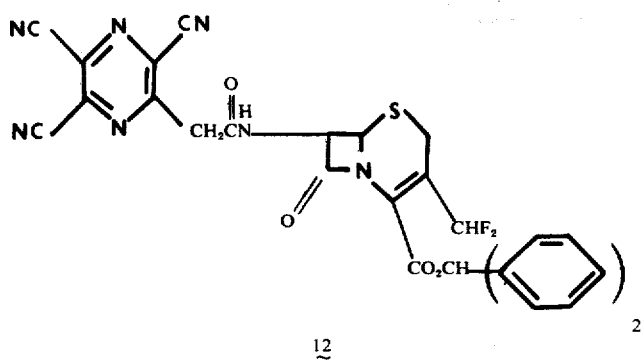

The residue from procedure 11 above can be dissolved in 50 ml acetone and 1.05 g of urea is added. When a solution of 1.37 g of 3-(2,5,6-tricyanopyrazinyl)acetyl chloride in 25 ml acetone is added and the mixture was stirred at 25° for 1.0 hr, on silica with CHCl₃ gives benzhydryl 3-difluoromethyl-7-(3-[2,5,6-tricyanopyrazinyl]-acetamido)-3-cephem-4-carboxylate.

Example 8

A13. 3-Difluoromethyl-7-(3-[2,5,6-tricyanopyrazinyl]-acetamido)-3-cephem-4-carboxylic Acid (13).

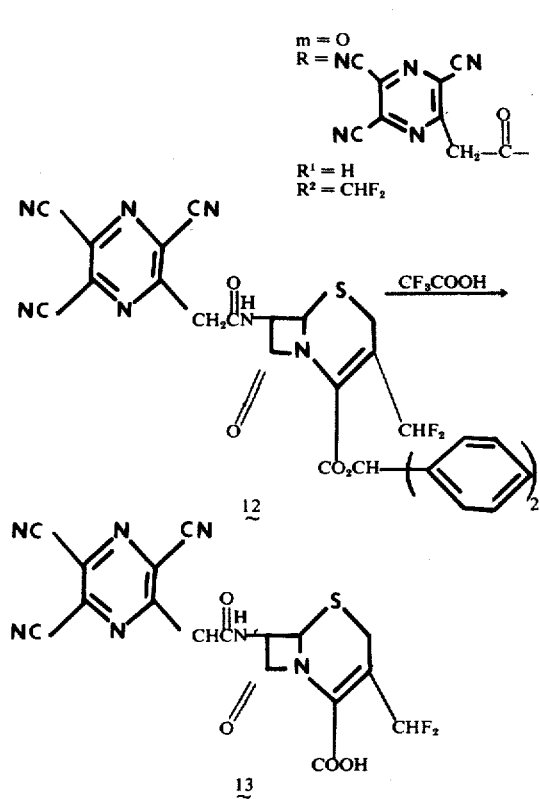

The benzhydryl ester can be removed as follows: To 0.797 g (1.3 mmoles) of benzhydryl 3-difluoromethyl-7-(3-[2,5,6-tricyanopyrazinyl]acetamido)-3-cephem-4-carboxylate and 0.150 g of anisole at 0° is added 20 ml of trifluoroacetic acid and the mixture stirred at 0° for 1.0 hours. Then the mixture is evaporated in vacuo, dissolved in ethyl acetate, washed with water, the ethyl acetate solution dried (MgSO₄) and stripped in vacuo. The residue can be recrystallized from ethanolic ethyl acetate to give 3-difluoromethyl-7-(3-[2,5,6-tricyanopyrazinyl]acetamido)-3-cephem-4-carboxylic acid.

Example 9

A14. Preparation of 2,2,2-Trichloroethyl 6-Phenylacetamidopenicillanate (15)

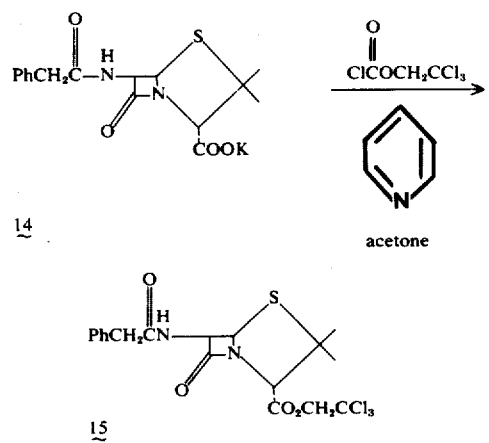

In the manner described in J. Org. Chem., 36, 1264 (1971), a mixture of 85 g of penicillin G potassium salt, (14) 100 ml of dry acetone, and 27 g of pyridine cooled to 0° in an ice bath was added to a solution of 48 g of 2,2,2-trichloroethyl chloroformate in 300 ml of acetone and the mixture was stirred at 0° for 18 hrs. The mixture was then filtered and the filtrate was heated to 40°, and the warm filtrate was diluted with water until cloudy. The resulting solution was put in the cold room overnight, then filtered to yield 80 g after drying overnight in a vacuum dessicator. The filtrate was diluted with an equal volume of water and chilled overnight. This yielded 15 g, for a total of 95 g (95%) of 2,2,2-trichloroethyl 6-phenylacetamidopenicillanate, mp 159°–161° (lit mp 160°–161°); ir (CHCl₃): 3400 (amide N—H) 1790–1770 (broad, β-lactam and ester C=O's), 1680 (amide C=O) and 1500 ("amide II") cm⁻¹; nmr (CDCl₃): δ 1.52 (6H, s, C(C$\underline{H}$₃)₂), 3.63 (2H, s, benzyl-C$\underline{H}$₂), 4.52 (1H, s, 4-$\underline{H}$). 4.78 (2H, s, —C$\underline{H}$₂CCl₃), 5.67

(2H, m, 6- and 7-$\underline{H}$), 6.40 (1H, d (J=8), N$\underline{H}$), and 7.34 (5H, s, aromatic).

A15. Preparation of 2,2,2-Trichloroethyl 6-Phenylacetamidopenicillanate-1-oxide (16).

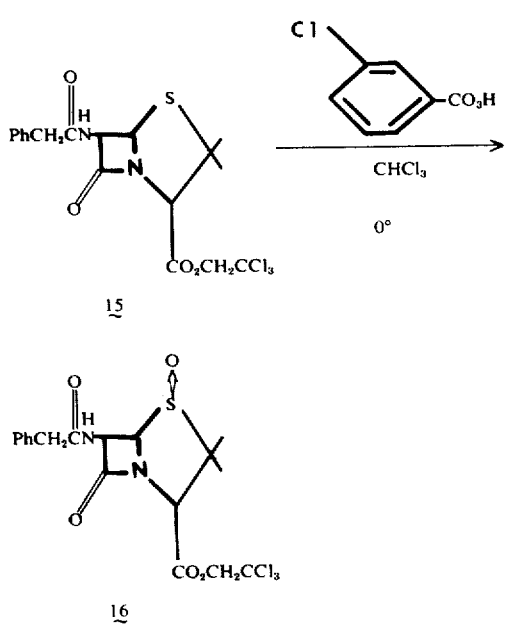

Following the procedure described in *J. Org. Chem.*, 36, 1264 (1971), to 25 g of 2,2,2-trichloroethyl 6-phenylacetamidopenicillanate in 265 ml of chloroform cooled to 0° was added dropwise a solution of 11.66 g of m-chloroperbenzoic acid in 130 ml of chloroform. The resulting solution was stirred at 0° for 2 hrs., then washed with 5% NaHCO₃ solution, dried over anhydrous MgSO₄, filtered, and evaporated to dryness on a rotary evaporator. The resulting residue was triturated with ether and filtered. Isolated was a total of 25.2 g (99%) of 2,2,2-trichloroethyl 6-phenylacetamidopenicillanate-1-oxide, mp 167°–169° (lit mp 167°–169°); ir (CHCl₃); 3400 (amide N—H), 1805 ($\beta$-lactam C=O), 1770 (ester C=O), 1695 (amide C=O), 1500 ("amide II" band), and 1050 (sulfoxide) cm⁻¹; nmr (CDCl₃): $\delta$ 1.27 (s, 3H, $\beta$-2-C$\underline{H}_3$), 1.73 (s, 3H, $\alpha$-2-C$\underline{H}_3$), 3.57 (2H, s, benzyl —C$\underline{H}_2$), 4.73 (2H, m, —C$\underline{H}_2$CCl₃), 4.98 (1H, d (J = 5 Hz), 6-$\underline{H}$), 5.89 (1H, doublet of doublets (J = 5Hz, J' = 10 Hz), 7-H), 6.90 (1H, d (J = 10 Hz), amide N—H), and 7.26 (5H, singlet, aromatic).

A16. Preparation of 2,2,2-Trichloroethyl 7-Phenylacetamido-3-methyl-3-cephem-4-carboxylate (17).

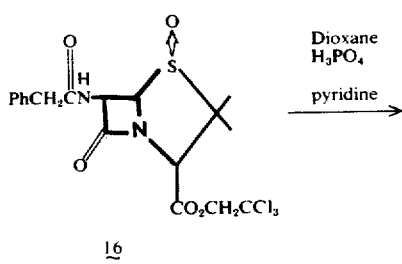

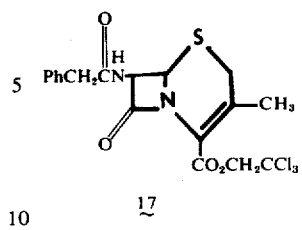

A solution of 9.64 g of 2,2,2-trichloroethyl 6-phenylacetamido-penicillanate-1-oxide, 0.45 g of 87% phosphoric acid, and 0.32 g of pyridine in 200 ml of dry dioxane was heated under reflux for 16 hrs. The flask was under a Soxhlet apparatus and condenser containing 15 g of molecular sieves in the extraction thimble to dry the distillate before it was returned to the reaction flask. After the heating period was completed, the solvent was evaporated on a rotary evaporator using a vacuum pump. The residue was dissolved in 200 ml of methylene chloride and washed with 100 ml each of water, 2$\underline{N}$ HCl solution, water, 3% NaHCO₃ solution, and water (saturated NaCl solution was added to the aqueous phase to break up any emulsions which formed during these extractions). The resulting methylene chloride solution was dried over anhydrous MgSO₄, filtered, and evaporated on a rotary evaporator. The residue was triturated with 25 ml of ethanol. After crystallization was complete, the solid was filtered, yielding 3.8 g (41%) of 2,2,2-trichloroethyl 7-phenylacetamido-3-methyl-3-cephem-4-carboxylate, mp 160°–161° (lit mp 162°–164°); ir (CHCl₃): 3400 (amide N—H), 1785 ($\beta$-lactam C=O), 1745 (ester C=O), 1695 (amide C=O) and 1500 ("amide II" band) cm⁻¹; nmr (CDCl₃): $\delta$ 2.17 (3H, s, 3-C$\underline{H}_3$), 3.35 (2H, m, 2-C$\underline{H}_2$), 3.64 (2H, s, benzyl C$\underline{H}_2$), 4.88 (2H, m, -C$\underline{H}_2$CCl₃), 6.64 (1H, d (J = 4.5 Hz), 6-H), 5.83 (1H, doublet of doublets (J = 4.5 Hz, J = 9 Hz), 7-$\underline{H}$), 6.42 (1H, d (J = 9 Hz), amide N—H), and 7.30 (5H, s, aromatic).

A17. Preparation of 2,2,2-Trichloroethyl 7-Phenylacetamido-3-methyl-3-cephem-4-carboxylate-1-oxide (18).

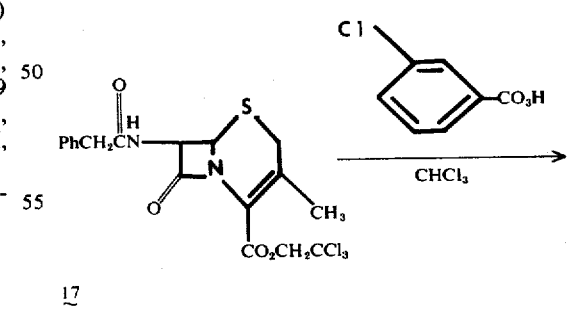

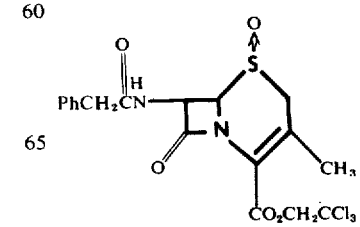

To a solution of 2.32 g of ester 17 in 25 ml CHCl₃ at 0° was added a solution of 1.1 g of m-chloroperbenzoic acid in 15 ml of CHCl₃ and the mixture was stirred at 0° for 2.0 hrs. The mixture was then washed with 5% NaHCO₃, dried (MgSO₄) and stripped in vacuo. Trituration of the residue with ether followed by filtration yielded 2.6 g of 2,2,2-trichloroethyl 7-phenylacetamido-3-methyl-3-cephem-4-carboxylate-1-oxide, mp 194°–195.5° d; ir (CHCl₃); 3500 (amide N—H), 1810 (β-lactam C=O), 1760 (ester C=O), 1700 (amide C=O), 1500 ("amide II" band), and 1040 (sulfoxide) cm⁻¹.

Anal. Calcd. for $C_{18}H_{17}Cl_3N_2O_5S$: C, 45.00; H, 3.55; N, 5.83. Found: C, 44.92; H, 3.43; N, 5.52.

A18. Preparation of 2,2,2Trichloroethyl 3-Bromomethyl 7-phenylacetamido-3-cephem-4-carboxylate-1-oxide (19)

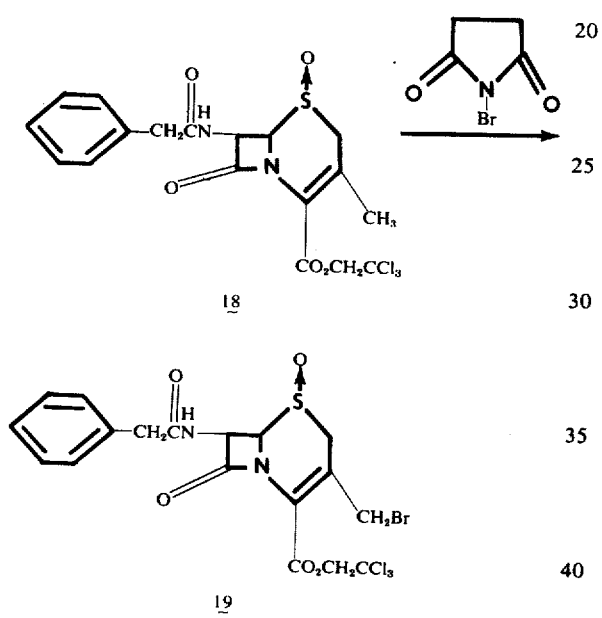

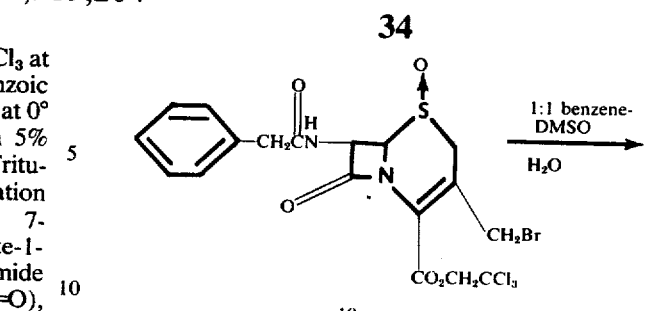

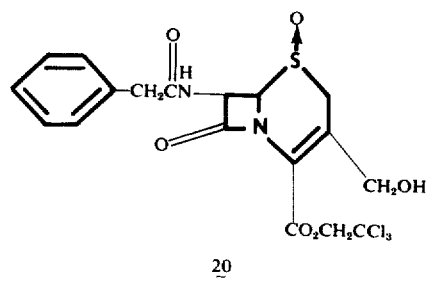

In the manner described in German Patent 2,042,169, a degassed solution of 5.0 g (0.010 mmoles) of sulfoxide 18 and 2.8 g of N-bromosuccinimide in 400 ml of ethylenedichloride at 0° under N₂ was irradiated at 0° for 1.0 hour with a 100 w. medium pressure Hanovia mercury lamp. The mixture was then washed with 2-100 ml portions of water and the combined aqueous layers were washed with 50 ml of ethylene dichloride. The combined ethylene dichloride solutions were dried (MgSO₄), stripped in vacuo, and the residue was chromatographed on silica gel with 9:1 CH₂Cl₂-acetone, yielding 2.53 g (43%) of 2,2,2-trichloroethyl 3-bromomethyl-7-phenylacetamido-3-cephem-4-carboxylate-1-oxide, mp 160°–163°d (lit mp 162°–164° d); nmr (dmso-d₆): δ 3.40 and 3.87 (AB, 2 ($J_{AB}$ = 14 Hz), C₂ —H's), 3.36 and 4.04 (AB, 2, $J_{AB}$ = 19 Hz), thienyl (α-CH₂), 4.39 and 4.76 (AB, 2 ($J_{AB}$ = 11 Hz), —C₃—CH₂-Br), 5.00 (d, 1 (J = 5), C₆—H), 4.93 and 5.35 (AB, 2 ($J_{AB}$ = 13), —CH₂CCl₃), 5.90 (dd, 1 (J = 5Hz, J' = 8 Hz), C —H), 7.25 (s, 5, phenyl-H), and 8.25 (d, 2 (J = 8Hz) amide N—H).

A19. 2,2,2-Trichloroethyl 3-Hydroxymethyl-7-phenylacetamido-3-cephem-4-carboxylate-1-oxide (20).

To a solution of 0.461 (0.82 mmole) of 2,2,2-trichloroethyl 3-bromoethyl-7-phenylacetamido-3-cephem-4-carboxylate-1-oxide in 20 ml of 1:1 benzene-dimethylsulfoxide is added 0.150 ml (8.2 mmoles) of water and the mixture is stirred at 25° for 7 days. Then the mixture is poured into 100 ml of H₂O and extracted with ethyl acetate. The ethyl acetate is dried (MgSO₄) and evaporated in vacuo to yield 2,2,2-trichloroethyl 3-hydroxymethyl-7-phenylacetamido-3-cephem-4-carboxylate-1-oxide, which can be purified by recrystallization from methanol.

A20. 2,2,2-Trichloroethyl 3-Formyl-7-phenylacetamido-3-cephem-4-carboxylate-1-oxide.

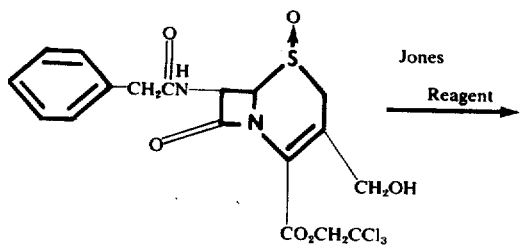

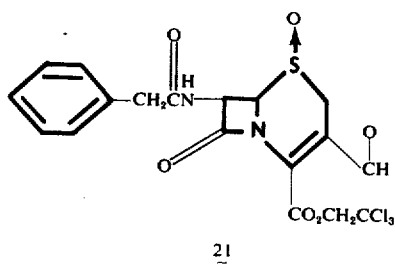

To a solution of 0.843 g (1.7 mmole) of 2,2,2-trichloroethyl 3-hydroxymethyl-7-phenylacetamido-3-cephem-4-carboxylate-1-oxide in 50 ml of acetone at 0° is added over the period of about 2 min. 0.450 ml of 8N CrO₃ in H₂SO₄ and the mixture is stirred at 0° for 5 min, then poured into a mixture of 300 ml ethyl acetate - 300 ml water and the ethyl acetate layer washed with water, dried (MgSO$_4$), and evaporated in vacuo. The residue when chromatographed on silica gel with CHCl$_3$ gives 2,2,2-trichloroethyl 3-formyl-7-phenylacetamido-3-cephem-4-carboxylate-1-oxide.

A21. 2,2,2-Trichloroethyl 3-Difluoromethyl-7-phenylacetamido-3-cephem-4-carboxylate-1-oxide (22).

m = 1

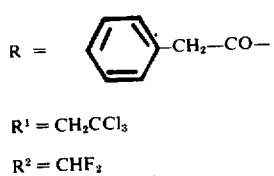

R$^1$ = CH$_2$CCl$_3$

R$^2$ = CHF$_2$

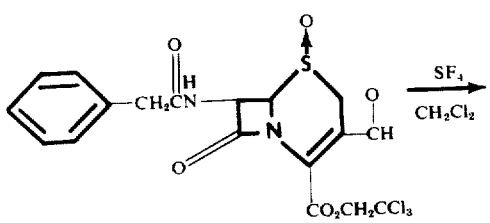

21

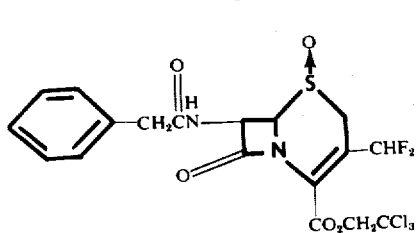

22

To a solution of 0.494 g (1.0 mmoles) of 2,2,2-trichloroethyl 3-formyl-7-phenylacetamido-3-cephem-4-carboxylate-1-oxide in an 80 ml Hastelloy bomb in 20 ml of CH$_2$Cl$_2$ at −25° is added 0.324 (3.0 mmoles) of sulfur tetrafluoride, and the mixture rocked at −25° for 1.0 hr, then poured into 50 ml of ice water and extracted with CH$_2$CL$_2$. The CH$_2$Cl$_2$ layer is separated, dried (MgSO$_4$), and evaporated in vacuo. Chromatography on silica gel with chloroform gives 2,2,2-trichloroethyl 3-formyl 7-phenylacetamido-3-cephem-4-carboxylate-1-oxide.

EXAMPLE 10

A22. 2,2,2-Trichloroethyl 3-Difluoromethyl-7-phenylacetamido-3-cephem-4-carboxylate (23)

m = O

R = 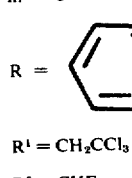—CH$_2$—C—

R$^1$ = CH$_2$CCl$_3$

R$^2$ = CHF$_2$

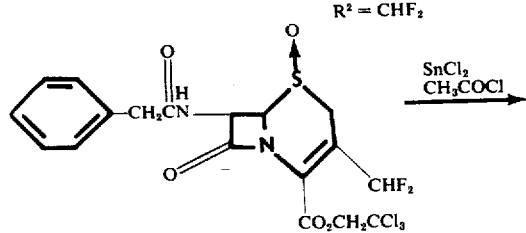

22

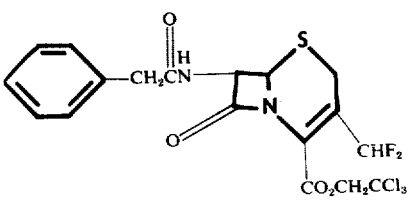

23

To a solution of 1.03 g (2.0 mmole) of 2,2,2-trichloroethyl 3-difluoromethyl-7-phenylacetamido-3-cephem-4-carboxylate-1-oxide in 10 ml CH$_3$CN and 3 ml DMF at 0° is added 0.414 g (2.2 mmole) anhydrous SnCl$_2$ and 0.700 g (9 mmole) acetyl chloride, and the resulting mixture is stirred at 0° for 1.0 hr, then at 25° for 1.0 hour, and then poured into water and extracted with ethyl acetate. The ethyl acetate layer after washing with 3% HCl solution, 5% NaHCO$_3$ solution, and water, and then drying (MgSO$_4$) and stripping in vacuo gives 2,2,2-trichloroethyl 3-difluoromethyl-7-phenylacetamido-3-cephem-4-carboxylate which can be purified by chromatography on silica gel with chloroform.

EXAMPLE 11

A23. 3-Difluoromethyl-7-phenylacetamido-3-cephem-4-carboxylic Acid (24)

m = O

R = 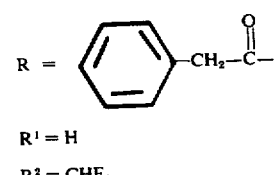

R$^1$ = H

R$^2$ = CHF$_2$

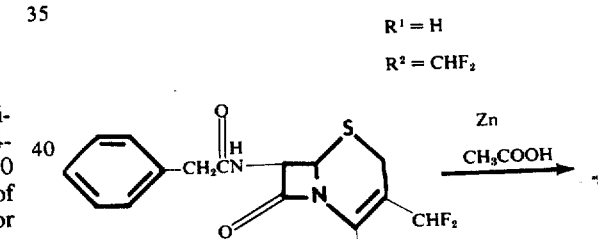

23

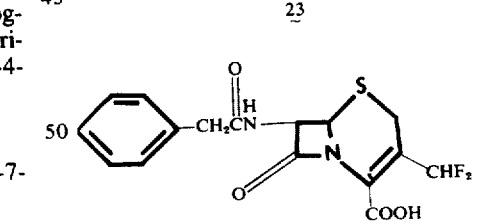

24

This can be prepared as follows: To 0.750 g (1.5 mmoles) of 2,2,2-trichloroethyl 3-difluoromethyl-7-phenylacetamido-3-cephem-4-carboxylate in 15 ml of glacial acetic acid at 0° is added 0.975 g (15 mmole) zinc dust and the mixture stirred at 0° for 3.0 hours. Then the mixture is poured into 100 ml of water, extracted with ethyl acetate, and the ethyl acetate solution is dried (MgSO$_4$) and stripped in vacuo. The residue can be recrystallized from 50% ethanol to give 3-difluoromethyl-7-phenylacetamido-3-cephem-4-carboxylic acid.

EXAMPLE 12

A24. 3-Acetoxymethyl-7-(2-thienylacetamido)-3-cephem-4-carboxylic Acid (25)

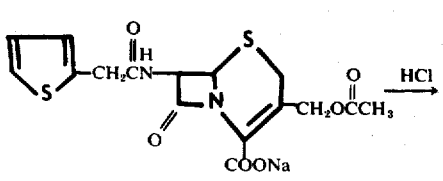

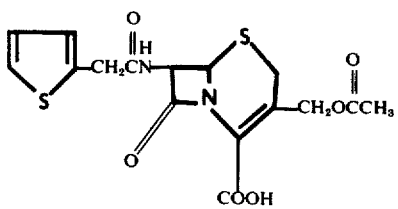

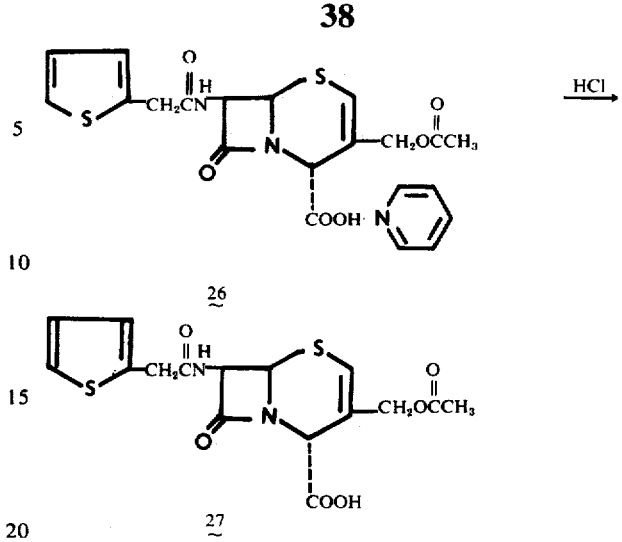

21.6 g of sodium cephalothin was dissolved in 500 ml of water and layered with 500 ml ethyl acetate. The mixture was acidified to pH 4 by addition of 6N-HCl, and the product was extracted into the ethyl acetate phase, which was dried (MgSO$_4$) and evaporated in vacuo to yield 20.4 g of 3-acetoxymethyl-7-(2-thienylacetamido)-3-cephem-4-carboxylic acid, mp 152°–154°.

A25. 3-Acetoxymethyl-7-(2-thienylacetamido)-2-cephem-4-carboxylic Acid Pyridine Salt (26)

This compound was prepared according to German Offenlegungschrift 2,103,014 as follows: To 13.8 g of the pyridine salt in 500 ml of water layered with ethyl acetate was added 6N HCl until pH4 was reached. Then the acid was extracted into the ethyl acetate layer which was dried (MgSO$_4$) and evaporated to yield 11.2 g of 3-acetoxymethyl-7-(2-thienylacetamido)-2-cephem-4-carboxylic acid, mp 149°–154°.

A27. 3-Hydroxymethyl-7-(2-thienylacetamido)-2-cephem-4-carboxylic acid (28)

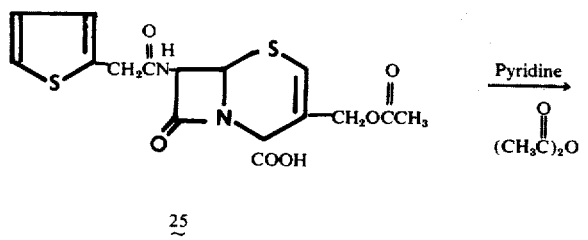

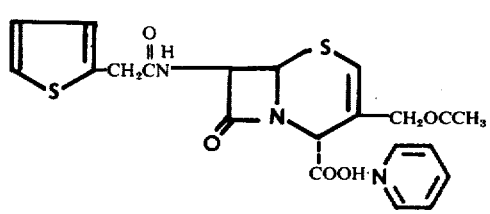

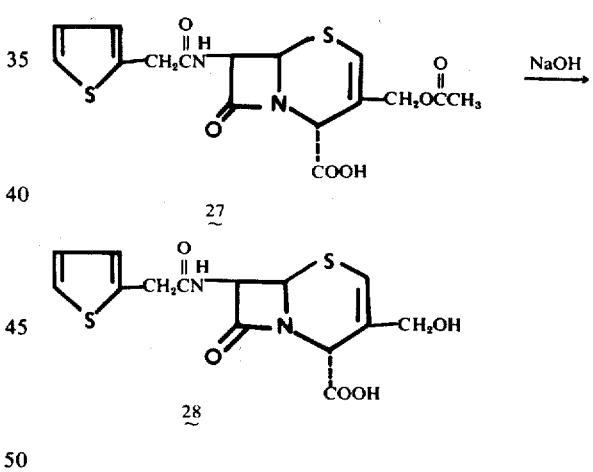

Using the method outlined in German Offenlegungschrift 2,103,014, 20.4 g of 3-acetoxymethyl-7-(2-thienylacetamido)-3-cephem-4-carboxylic acid was dissolved in 60 ml of dry pyridine, with heating and then 6 ml of acetic anhydride was added to the cooled solution. The mixture solidified on standing for 2 hours. It was then diluted with 50 ml of pyridine and the solid filtered and washed with 150 ml of ethyl acetate. The product was recrystallized from 150 ml of ethyl acetate and 20 ml of alcohol to yield 15.4 g of 3-acetoxymethyl-7-(2-thienylacetamido)-2-cephem-4-carboxylic acid pyridine salt, mp 150°–151°D.

A26. 3-Acetoxymethyl-7-(2-thienylacetamido)-2-cephem-4-carboxylic acid (27)

This compound was prepared according to German Offenlegungschrift 2,103,014 as follows: A suspension of 11.8 g of the acetoxymethyl compound 10 in 150 ml of water and 15 ml of acetone was treated with 21 ml of 1-N NaOH and heated to 40°. Then the mixture was kept at 50° for 17 hours, then layered with 500 ml ethyl acetate and acidified to pH4 with 2-N H$_2$SO$_4$. The product was extracted with the ethyl acetate layer, which was washed with water, dried (MgSO$_4$), and concentrated at > 35° in vacuo. From this concentrate, 3.0 g of 3-hydroxymethyl > 7-(2-thienylacetamido)-2-cephem-4-carboxylic acid, mp 147°–149°d, was obtained A28. Benzhydryl 3-Hydroxymethyl-7-(2-thienylacetamido)-2-cephem-4-carboxylate (29)

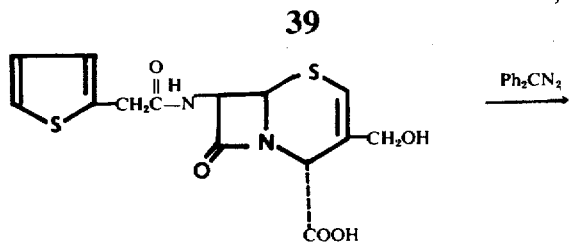

28

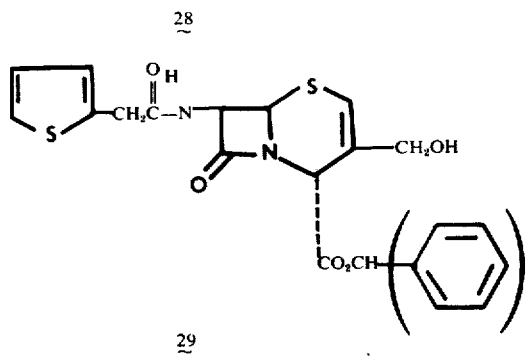

29

This compound was prepared according to German Offenlengngschrift 2,103,914 as follows: A solution of 3.54 g of the Δ²-hydroxymethyl acid 28 in 100 ml of tetrahydrofuran was treated with a solution of 1.94 g of diazodiphenylmethane in 50 ml of tetrahydrofuran. The mixture was stirred until the pink color had faded, and stripped of solvent in vacuo to yield 5.2 g of benzhydryl 3-hydroxymethyl-7-(2-thienylacetamido)-2-cephem-4-carboxylate, mp 168°–170°.

A29. Benzhydryl 3-Hydroxymethyl-7-(2-thienylacetamido)-3-cephem-4-carboxylate-1-oxide (7)

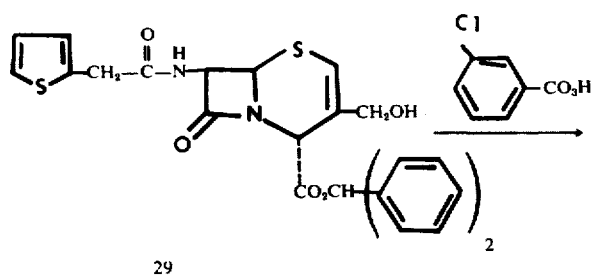

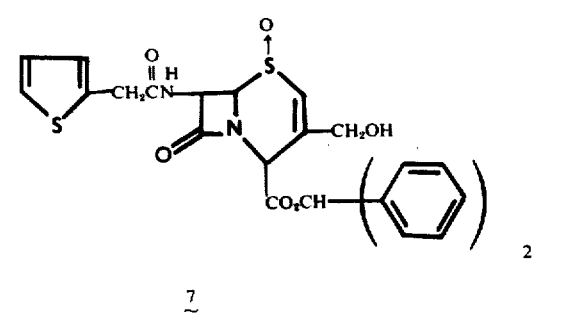

7

To a solution of 5.2 g of benzhydryl 3-hydromethyl-7-(2-thienylacetamido)-2-cephem-4-carboxylate in 50 ml of CHCl₃ at 0° is added dropwise a solution of 1.72 g of m-chloroperbenzoic acid in 25 ml of CHCl₃. The resulting solution is stirred for 3.0 hours at 0°, then washed with 5% NaHCO₃, dried (MgSO₄), and evaporated in vacuo. The residue is dissolved in methanol and then concentrated to give, upon cooling, benzhydryl 3-hydroxymethyl-7-(2-thienylacetamido)-3-cephem-4-carboxylate-1-oxide.

A30. Benzhydryl-3-formyl-7-(2-thienylacetamido)-2-cephem-4-carboxylate (30)

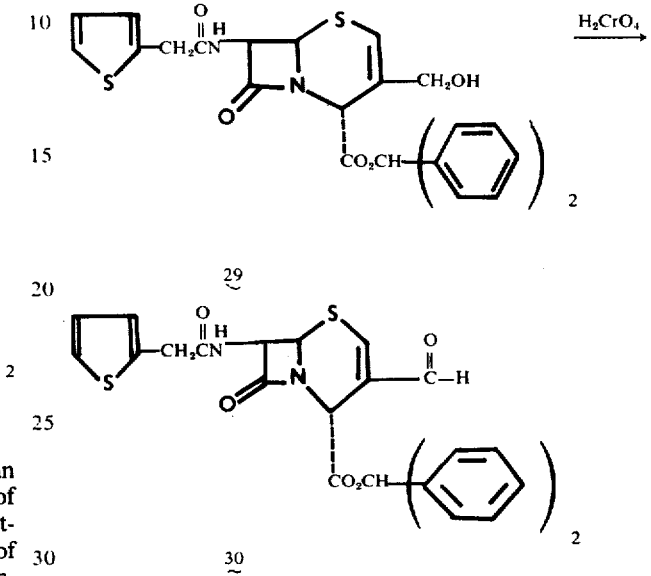

30

This compound is prepared according to German Ofenlegungschrift 2,103,014 as follows: A solution of 1.04 g of the hydroxymethyl compound 12 in 50 ml of acetone at 0° is treated with 0.6 ml of 8N CrO₃ in sulfuric acid and stirred at 0° for 20 minutes. The mixture is poured into 150 ml of water and extracted with ethyl acetate. The ethyl acetate layer is washed with water and then dried (MgSO₄) and stripped in vacuo. The product is chromatographed on silica gel with chloroform to yield benzhydryl 3-formyl-6-(2-thienylacetamido)-2-cephem-4-carboxylate, mp 141°–142.5°d.

A31. Benzhydryl 3-Difluoromethyl-7-(2-thienylacetamido)-2-cephem-4-carbonate (31)

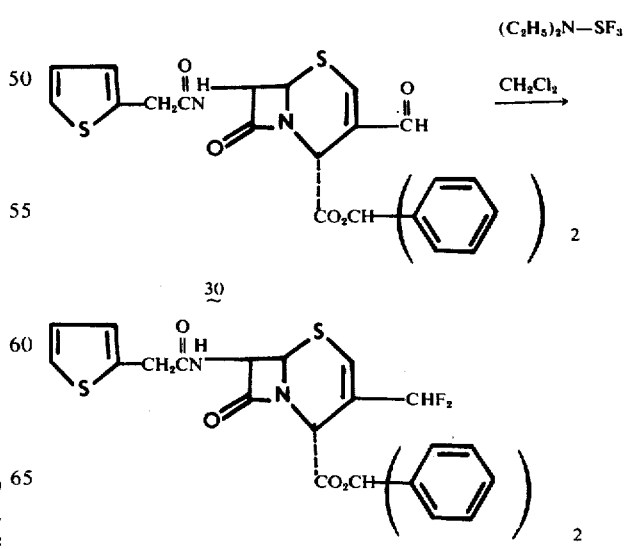

31

To a solution of 1.56 of benzhydryl 3-formyl-7-(2-thienylacetamido)-2-cephem-4-carboxylate in 25 ml of $CH_2Cl_2$ at 27° is added 0.483 g of diethylaminosulfur trifluoride and the mixture is stirred at 27° for 1.5 hour, then poured into water. The $CH_2Cl_2$ layer is dried ($MgSO_4$) and evaporated in vacuo. The residue is chromatographed on silica with $CHCl_3$ to give benzhydryl 3-difluoromethyl-7-(2-thienylacetamido)-2-cephem-4-carboxylate.

EXAMPLE 13

A32. Benzhydryl 3-Difluoromethyl-7-(2-thienylacetamido)-2-cephem-4-carboxylate-1-oxide (9)

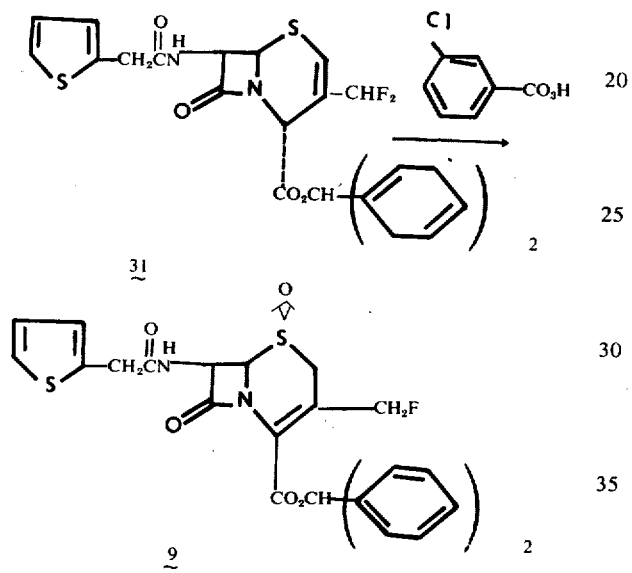

To a solution of 2.16 g of benzhydryl 3-difluoromethyl-7-(2-thienylacetamido)-2-cephem-4-carboxylate in 50 ml of $CHCl_3$ at 0° is added dropwise a solution of 0.860 g of m-chloroperbenzoic acid in 20 ml of $CHCl_3$. The mixture is stirred at 0° for 3.0 hours, then washed with 5% $NaHCO_3$ solution, dried ($MgSO_4$), and stripped in vacuo. The residue is recrystallized from methanol to give benzhydryl 3-difluoromethyl-7-(2-thienylacetamido)-3-cephem-4-carboxylate-1-oxide.

EXAMPLE 14

B1 Benzhydryl 3-Carboxy-7-(2-thienylacetamido)-3-cephem-4-carboxylate (32)

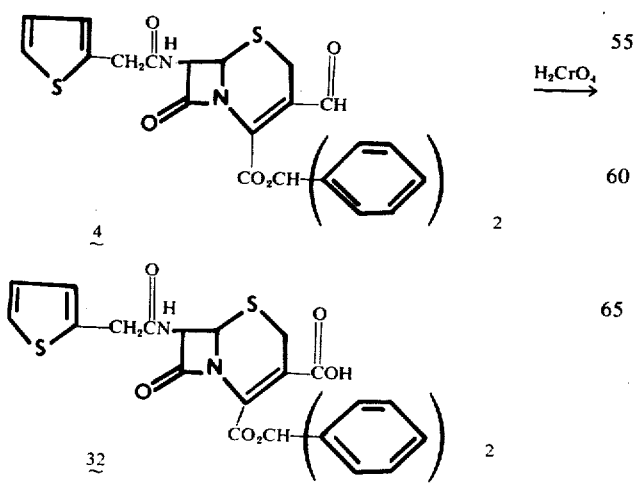

When a solution of 1.56 g of benzhydryl 3-formyl-7-(2-thienylacetamido)-3-cephem-4-carboxylate (4) in 10ml of glacial acetic acid is added to a solution of 0.32 g of $K_2Cr_2O_7$ in 5 ml 30% $H_2SO_4$ and the mixture stirred for 2.0 hrs, poured into 50 ml of water and extracted with ethyl acetate, the ethyl acetate layer after being washed several times with water, dried ($MgSO_4$), and evaporated in vacuo contains benzhydryl 3-carboxy-7-(2-thienylacetamido)-3-cephem-4-carboxylate, which can be purified by recrystallization from ethyl acetate.

Alternatively, the oxidation can be performed by addition of Jones reagent (8N $CrO_3$ in sulfuric acid) to an acetone solution of the aldehyde 4.

B2. Benzhydryl 3-Trifluoromethyl-7-(2-thienylacetamido)-3-cephem-4-carboxylate (33)

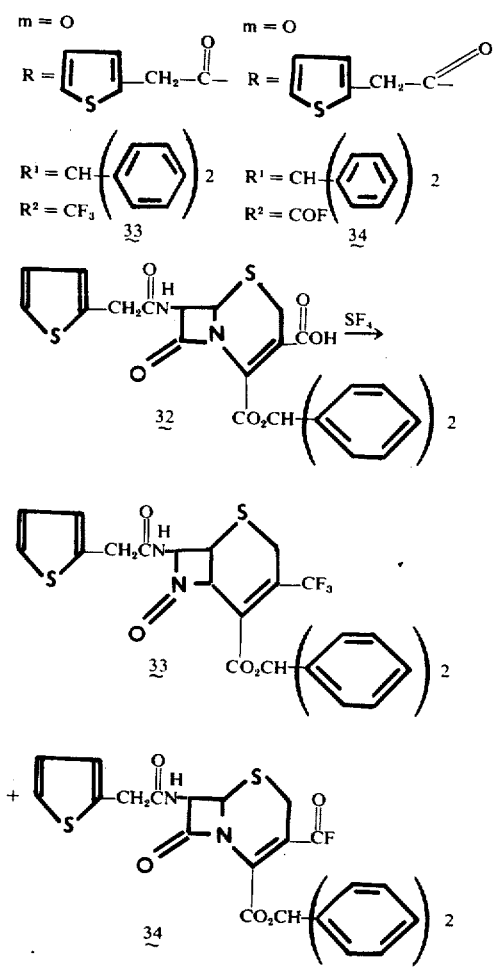

To a solution of 0.996 g (2.0 mmoles) of benzhydryl 3-carboxy-7-(2-thienylacetamido)-3-cephem-4-carboxylate, 50μl of water, and 250 μl of tetrahydrofuran in an 80 ml Hastelloy bomb in 40 ml of $CH_2Cl_2$ at 0° is added 0.650 g (6.0 mmoles) of sulfur tetrafluoride. The mixture is rocked at 20° for 3 days, then poured into 100 ml of ice water and extracted with $CH_2Cl_2$. The $CH_2Cl_2$ layer is separated, dried ($MgSO_4$), and evaporated in vacuo. Chromatography on silica gel with chloroform gives benzhydryl 3-trifluoromethyl-7-(2-thienylacetamido-3-cephem-4-carboxylate. The acyl fluoride (34) can also be isolated from this mixture, and can be made the major product using a short reaction time.

EXAMPLE 15

B3. 3-Trifluoromethyl-7-(2-thienylacetamido)-3-cephem-4-carboxylic Acid (35).

m = 0

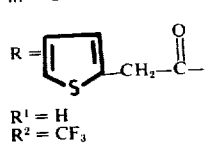

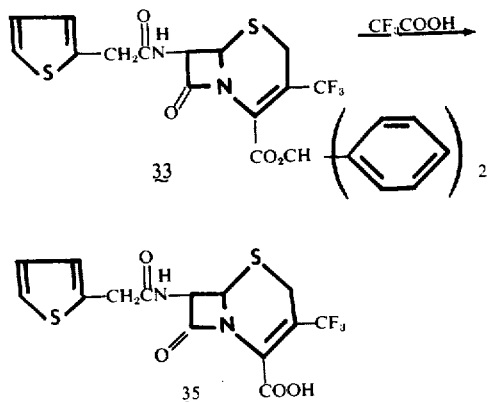

When 1.12 g (2.0 mmoles) of benzhydryl 3-trifluoromethyl-7-(2-thienylacetamido)-3-cephem-4-carboxylate and 0.208 g of anisole at 0° is reacted with 25 ml trifluoroacetic acid and the mixture stirred at 0° for 1.0 hours, the mixture after evaporation in vacuo and purification gives 3-trifluoromethyl-7-(2-thienylacetamido)-3-cephem-4-carboxylic acid dissolved in ethyl acetate, washed with water, and the ethylacetate solution is dried (MgSO$_4$) and stripped in vacuo. The residue is recrystallized from ethanol to give the trifluoromethyl acid.

EXAMPLE 16

B4. Benzhydryl 3-Carboxy-7-(2-thienylacetamido)-3-cephem-carboxylate-1-oxide (36).

A solution of 2.1 g of benzhydryl 3-formyl-7-(2-thienylacetamido)-3-cephem-4-carboxylate-1-oxide (28) in 10 ml of glacial acetic acid is added to a solution of 0.43 g of K$_2$Cr$_2$O$_7$ in 5 ml of 30% H$_2$SO$_4$ and the mixture stirred for 2.0 hrs, then poured into water and extracted with ethyl acetate. The ethyl acetate layer contains benzhydryl 3-carboxy-7-(2-thienylacetamido)-3-cephem-4-carboxylate-1-oxide, which can be purified by crystallization from ethyl acetate.

The oxidation cal also be carried out with Jones reagent as in Procedure 1 in part B.

B5. Benzhydryl 3-Trifluoromethyl-7-(2-thienylacetamido)-3-cephem-4-carboxylate-1-oxide (37).

m = 1

The procedure 2 (preceding) can be used to give the corresponding S-oxide in the following manner:

To a solution of 0.720 g (1.4 mmoles) of benzhydryl 3-carboxy-7-(2-thienylacetamido)-3-cephem-4-carboxylate-1-oxide, 35 µl of water, and 160 µl of tetrahydrofuran in an 80 ml Hastelloy bomb in 25 ml of CH$_2$Cl$_2$ at 0° is added 0.450 g (4.2 mmoles) of sulfur tetrafluoride. The mixture after stirring at 20° for 3 days, is poured into 50 ml of ice water and extracted with CH$_2$Cl$_2$. The CH$_2$Cl$_2$ layer is separated, dried (MgSO$_4$), and is evaporated in vacuo. Chromatography on silica gel with 9:1 CH$_2$Cl$_2$/acetone gives benzhydryl 3-trifluoromethyl-7-(2-thienylacetamido)-3-cephem-4-carboxylate-1-oxide. Short reaction times gives the acid fluoride 38 which can be converted to the trifluoride by longer reactions.

EXAMPLE 17

B6. Benzhydryl 3-Trifluoromethyl-7-(2-thienylacetamido)-3-cephem-4-carboxylate (33).

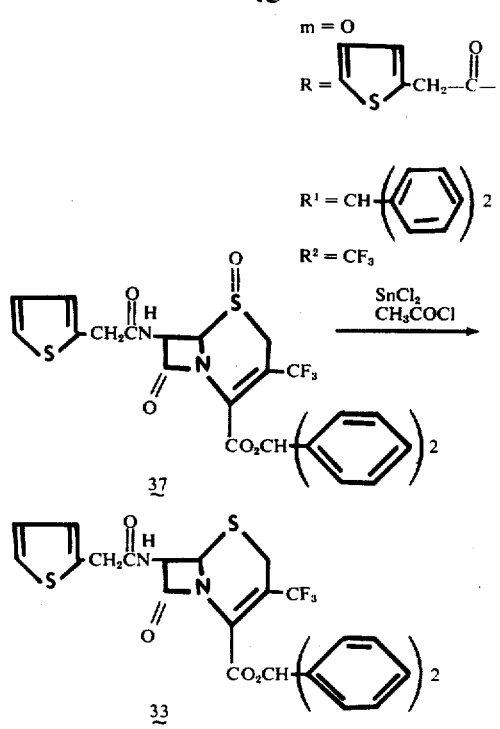

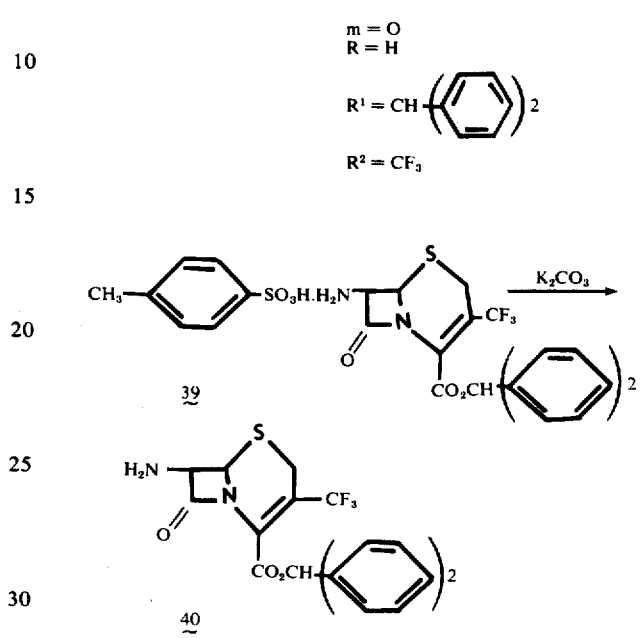

The sulfoxide oxygen can be removed as follows: To a solution of 1.05 g (1.83 mmole) of benzhydryl 3-trifluoromethyl-7-(2-thienylacetamido)-3-cephem-4-carboxylate-1-oxide in 10 ml $CH_3CN$ and 3 ml DMF at 0° is added 0.380 g (2.1 mmole) anhydrous $SnCl_2$ and 0.560 g (7.5 mmole) acetyl chloride, and the resulting mixture stirred at 0° for 1.0 hr, then at 25° for 1.0 hr, and then poured into water and extracted with ethyl acetate. The ethyl acetate layer is preferably washed with 3% HCl solution, 5% $NaHCO_3$ solution, and water, and then is dried ($MgSO_4$) and stripped in vacuo to give benzhydryl 3-trifluoromethyl-7-(2-thienylacetamido)-3-cephem-4-carboxylate.

EXAMPLE 18

B7. Benzhydryl 7-Amino-3-trifluoromethyl-3-cephem-4-carboxylate p-Toluenesulfonic Acid Salt (39).

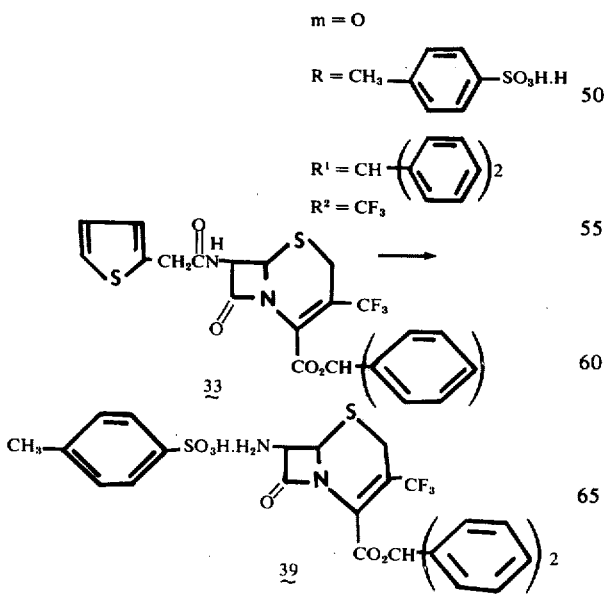

The p-toluenesulfonic acid salt of benzhydryl 7-amino-3-trifluoromethyl-3-cephem-4-carboxylate is produced by the procedure of part A process No. 10.

EXAMPLE 19

B8. Benzhydryl 7-Amino-3-triflfuoromethyl-3-cephem-4-carboxylate (40).

By use of the procedure of process 11 of A above, the p-toluenesulfonic acid salt of benzhydryl 7-amine-3-trifluoromethyl-3-cephem-4-carboxylate gives the amino ester which can be used as such in procedure 9 below.

EXAMPLE 20

B9. Benzhydryl 3-Trifluoromethyl-7-(D-α-t-butoxycarboxamido-4-cyclohexa-1,4-dienylacetamido)-3-cephem-4-carboxylate (41).

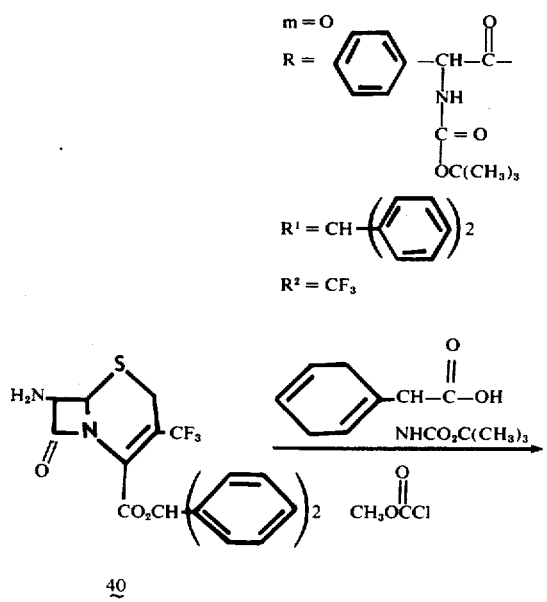

-continued

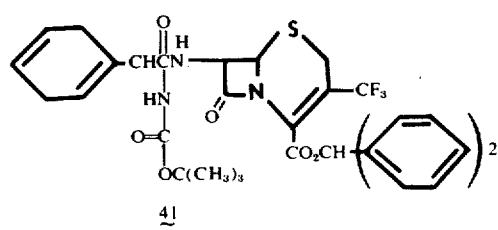

41

To a solution of 0.420 g methyl chloroformate in 40 ml of THF at −25° is added a solution of 1.0 g of D-α-t-butoxycarboxamido-1,4-cyclohexadienylacetic acid and 0.420 g triethylamine in 20 ml of THF. After 0.5 hr, a solution of the amine prepared as described by procedure 8 above in 20 ml of THF is added and the mixture stirred at −25° for 3.0 hrs. The mixture is then poured into 200 ml of water layered with 200 ml of ethyl acetate and shaken. The ethyl acetate layer is washed with 5% NaHCO$_3$ solution followed by 5% HCl solution, then dried (MgSO$_4$) and stripped in vacuo. The residue can be crystallized from CCl$_4$ to give benzhydryl 3-trifluoromethyl-7-(D-α-t-butoxycarboxamido-4-cyclohexa-1,4-dienylacetamido)-3-cephem-4-carboxylate.

EXAMPLE 21

B10. 3-Trifluoromethyl-7-(D-α-amino-α-cyclohexa-1,4-dienylacetamido)-3-cephem-4-carboxylic Acid (42).

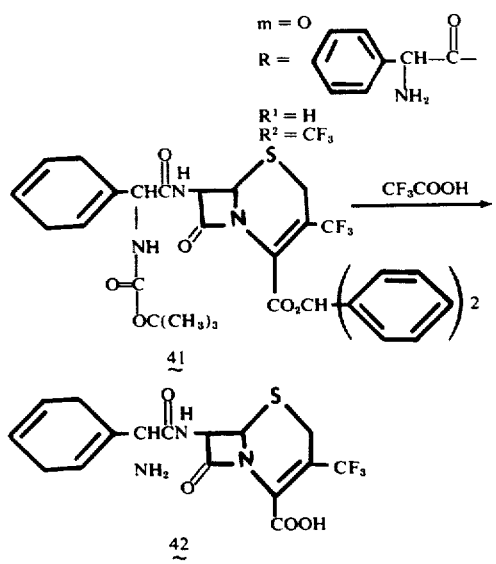

To 0.635 g (1.0 mmoles) of benzhydryl 3-trifluoromethyl-7-(D-α-t-butoxycarboxamidocyclohexa-1,4-dienylacetamido-3-cephem-4-carboxylate and 0.115 g of anisole at 0° is added 20 ml of trifluoroacetic acid and the mixture stirred at 0° for 2.0 hours. When the mixture is evaporated in vacuo, dissolved in water, and adjusted to the isoelectric point of the amine acid there is obtained 3-trifluoromethyl-7-(D-α-amino-α-cyclohexa-1,4-dienylacetamido)-3-cephem-4-carboxylic acid.

EXAMPLE 22

B11. 2,2,2-Trichloroethyl 3-carboxy-7-phenylacetamido-3-cephem-4-carboxylate-1-oxide (43).

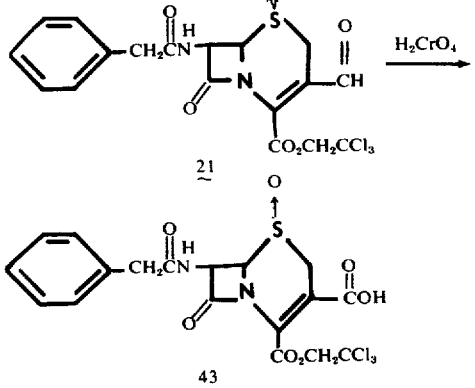

To a solution of 0.884 g (2.0 mmoles) of 2,2,2-trichloroethyl 3-formyl-7-phenylacetamido-3-cephem-4-carboxylate-1-oxide in 50 ml of acetone at 0° is added over the period of 2 min. 0.530 ml of 8N CrO$_3$ in H$_2$SO$_4$ and the mixture is stirred at 0° for 0.5 hr and then poured into 300 ml of water layered with 300 ml of ethyl acetate. The ethyl acetate layer after washing with water, drying (MgSO$_4$), and evaporating in vacuo contains 2,2,2-trichloroethyl 3-carboxy-7-phenylacetamido-3-cephem-4-carboxylate-1-oxide which can be recrystallized from methanol.

B12. 2,2,2Trichloroethyl 3-Trifluoromethyl-7-phenylacetamido-3-cephem-4-carboxylate-1-oxide (44).

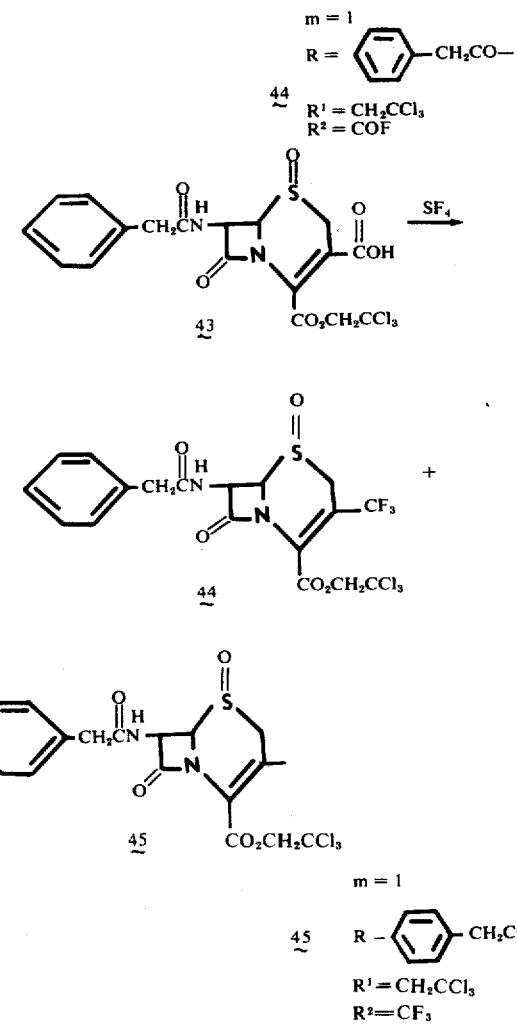

When the general process of procedures 2 and 5 is applied to the compound of the preceding section there is obtained 2,2,2-trichloroethyl 3-trifluoromethyl-7-phenylacetamido-3-cephem-4-carboxylate-1-oxide. The acyl fluoride 45 can also be isolated by chromatography.

EXAMPLE 23

B13.  2,2,2-Trichloroethyl 3-Trifluoromethyl-7-phenylacetamido-3-cephem-4-carboxylate (46).

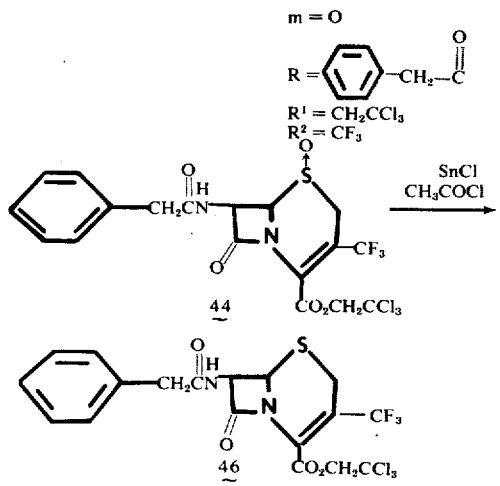

The oxygen of the s-oxide can be removed by the general procedure of procedure 6 above to give 2,2,2-trichloroethyl 3-trifluoromethyl-7-phenylacetamido-3-cephem-4-carboxylate.

EXAMPLE 24

B14. 3-Trifluoromethyl-7-phenylacetamido-3-cephem-4-carboxylic Acid (47).

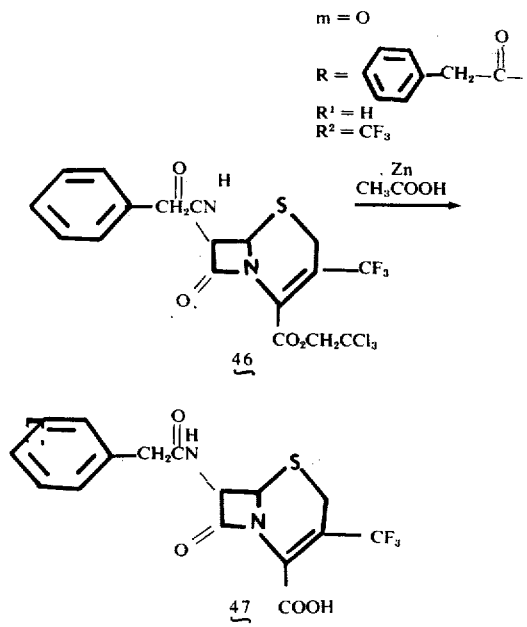

EXAMPLE 25

B15.   Benzylhydryl   3-Trifluoromethyl-7-(2-thienylacetamido)-2-cephem-4-carboxylate (47) and the corresponding -acyl fluoride (48).

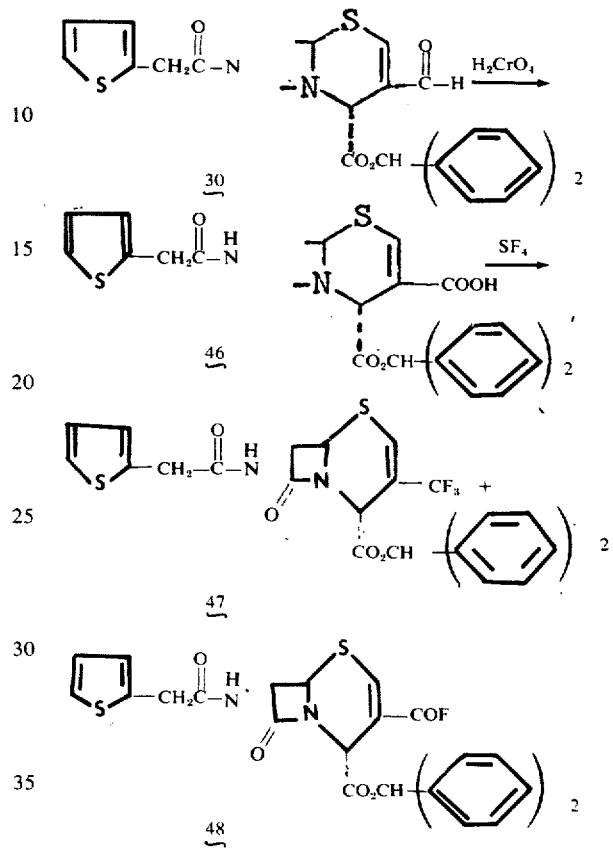

When compound 30 is reached with $H_2CrO_4$ according to the process of B1 to give the acid 46, which is in turn reacted with $SF_4$ as in B2, the resulting products are benzyhydryl 3-trifluoromethyl-7-(2-thienylacetamido)-2-cephem-4-carboxylate and the corresponding acyl fluoride.

When the general procedure of part A, process 23 is employed on the compound obtained in the preceding section, there is produced 3-trifluoromethyl-7-phenylacetamido-3-cephem-4-carboxylic acid.

The new compounds of this invention are useful as antibacterial agents. For example, benzyhydryl 3-difluoromethyl-7-(2-thienylacetamido)-3-cephem-4-carboxylate (see examples - Scheme A, part 4) inhibited B. Subtilis, Staph. aureus, and Strep. pyogenes at 0.4, 2 and 0.4 mcg/ml, about the same concentrations at which commercial cephalosporin was effective. This new compound inhibited the growth of S. typhimurium, a gram negative bacterium. The sulfoxide, benzhydryl 3-difluoromethyl-7-(2-thienylacetamido)-3-cephem-4-carboxylate-1-oxide, inhibited B. Subtilis and Staph. aureus at 10 mcg/ml and Strep. pyogenes at 2 mcg/ml.

The new compounds of this invention are active when administered orally. Those having two or more fluorines are particularly useful in retaining their activity over extended periods in contact with physiological fluids.

The sulfoxide compounds and the acyl fluorides are also useful as intermediates in making the other compounds of the invention.

The embodiments of the invention in which an exclusive property or privilege is claimed are defined as follows:

1. A compound of the formula (1) 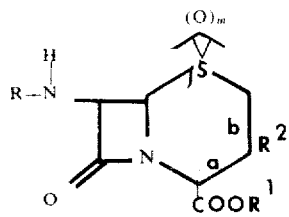

wherein:
$m$ is zero or 1;
$a$ and $b$ are either a single or double bond with the proviso that $b$ is a double bond only when $m = 0$ and $a$ is a single bond;
R is H or

in which Q is phenylmethyl, 2-thienylmethyl, 3-[1,2,5-thiadiazolyl]methyl 3-[2,5,6-tricyanopyrazinyl]methyl or furfurylmethyl;
$R^1$ is H, diphenylmethyl or 2,2,2-trichloroethyl alkali metal, alkaline earth metal, and ammonium or amine salt; and
$R^2$ is $CHF_2$, $CF_3$ or COF; and 2. a pharmaceutically acceptable acid addition salt of (1).

2. A compound according to claim 1 in which $R^2$ is $CHF_2$.

3. A compound according to claim 1 in which $R^2$ is $CF_3$.

4. A compound according to claim 1 in which $R^2$ is COF.

5. A compound according to claim 1 in which R is 2-thienylacetyl.

6. A compound according to claim 1 in which R is 2,5,6-tricyanopyrazinylacetyl.

7. A compound according to claim 1 in which R is phenylacetyl.

8. A compound according to claim 1 in which R is H.

9. A compound according to claim 1 in which $R^1$ is H.

10. A compound according to claim 1 in which $R^1$ is benzhydryl.

11. A compound according to claim 1 in which $R^1$ is 2,2,2-trichloroethyl.

12. A compound according to claim 2 which is benzhydryl-3-difluoromethyl-7-(2-thienylacetamido)-3-cephem-4-carboxylate.

13. A compound according to claim 2 which is 3-difluoromethyl-7-(2-thienylacetamido)-3-cephem-4-carboxylic acid.

14. A compound according to claim 2 which is benzhydryl-3-difluoromethyl-7-(2-thienylacetamido)-3-cephem-4-carboxylate-1-oxide.

15. A compound according to claim 2 which is benzhydryl-7-amino-3-difluoromethyl-3-cephem-4-carboxylate.

16. A compound according to claim 2 which is benzyhydryl-3-difluoromethyl-7-(3-[2,5,6-tricyanopyrazinyl]-acetamido)-3-cephem-4-carboxylate.

17. A compound according to claim 2 which is 3-difluoromethyl-7-(3-[2,5,6-tricyanopyrazinyl]acetamido)-3-cephem-4-carboxylic acid.

18. A compound according to claim 2 which is 2,2,2-trichloroethyl-3-difluoromethyl-7-phenylacetamido-3-cephem-4-carboxylate-1-oxide.

19. A compound according to claim 2 which is 2,2,2-trichloroethyl-3-difluoromethyl-7-phenylacetamido-3-cephem-4-carboxylate.

20. A compound according to claim 2 which is 3-difluoromethyl-7-phenylacetamido-3-cephem-4-carboxylic acid.

21. A compound according to claim 3 which is benzhydryl-3-trifluoromethyl-7-(2-thienylacetamido)-3-cephem-4-carboxylate.

22. A compound according to claim 3 which is 3-trifluoromethyl-7-(2-thienylacetamido)-3-cephem-4-carboxylic acid.

23. A compound according to claim 3 which is benzhydryl-3-trifluoromethyl-7-(2-thienylacetamido)-3-cephem-4-carboxylate-1-oxide.

24. A compound according to claim 3 which is benzhydryl-7-amino-3-trifluoromethyl-3-cephem-4-carboxylate.

25. A compound according to claim 3 which is 2,2,2-trichloroethyl-3-trifluoromethyl-7-phenylacetamido-3-cephem-4-carboxylate.

26. A compound according to claim 3 which is 3-trifluoromethyl-7-phenylacetamido-3-cephem-4-carboxylic acid.

27. A process comprising contacting under anhydrous conditions a compound of the formula

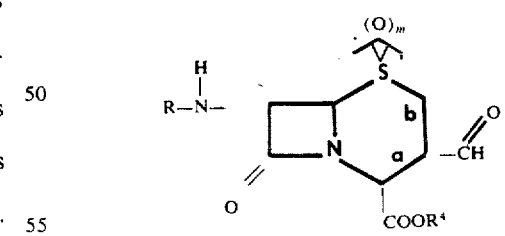

wherein:
$m$ is zero or 1;
$a$ and $b$ are either a single or double bond with the proviso that $b$ is a double bond only when $m = 0$ and $a$ is a single bond;
R is H or

in which Q is phenylmethyl, 2-thienyl methyl, 3-[1,2,5-thiadiazolyl]methyl, 3-[2,5,6-tricyanopyrazinyl]methyl or furfurylmethyl; and R⁴ is diphenylmethyl or 2,2,2-trichloroethyl; with a fluorinating agent of the group SF₄ and phenylsulfur trifluoride at a temperature range of −80°C. to +75°C. and recovering a compound of the formula

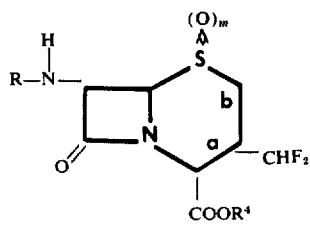

wherein:

a, b, m, R and R⁴ are as defined above.

28. A process comprising contacting a compound of the formula

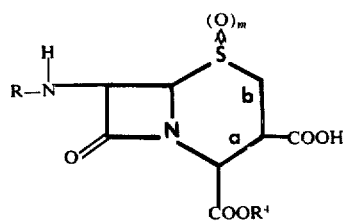

wherein:

m is zero or 1;
a and b are either a single or double bond with the proviso that b is a double bond only when m = 0 and a is a single bond;
R is H or

wherein:

Q is phenylmethyl, 2-thienylmethyl, 3-[1,2,5-thiadiazolyl]methyl, 3-[2,5,6-tricyanopyrazinyl]methyl or furfurylmethyl;
R⁴ is diphenylmethyl or 2,2,2-trichloroethyl; with SF₄ at a temperature range of 0°C. to 35°C. and recovering a compound of the formula

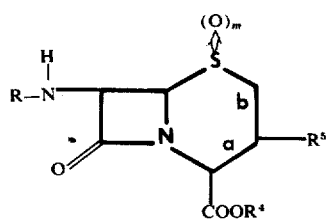

wherein:

a, b, m, R and R⁴ are as defined above and R⁵ is CF₃ or COF.

29. The process of claim 27 in which m = 0.
30. The process of claim 27 in which m = 1.
31. The process of claim 27 in which m = 0 and R⁴ is

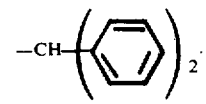

32. The process of claim 27 in which m = 0 and R⁴ is —CH₂CCl₃.
33. The process of claim 27 in which the fluorinating agent is SF₄.
34. The process of claim 27 in which the fluorinating agent is phenylsulfur trifluoride.
35. The process of claim 28 in which m = 0.
36. The process of claim 28 in which m = 1.
37. The process of claim 28 in which m = 0 and R⁴ is

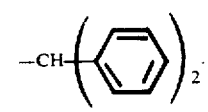

38. The process of claim 28 in which m = 0 and R⁴ is —CH₂CCl₃.
39. A process which comprises the sequential steps of
a. contacting at a temperature range of about 30°–65°C. a compound of the formula

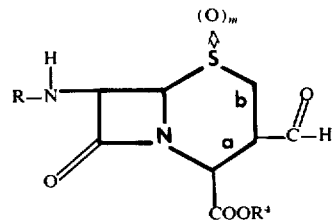

wherein:

m is zero or 1;
a and b are either a single or double bond with the proviso that b is a double bond only when m = 0 and a is a single bond;
R is H or

in which Q is phenylmethyl, 2-thienylmethyl, 3-[1,2,5-thiadiazolyl]methyl, 3-[2,5,6-tricyanopyrazinyl]methyl or furfurylmethyl; and R⁴ is diphenylmethyl or 2,2,2-trichloroethyl; with chromic acid to oxidize the 3-aldehyde group to 3-carboxy group; and then b. contacting the product of step (a) with SF₄ under anhydrous conditions at a temperature range of 0°C. to 35°C. to recover a compound having CF₃ or COF on the 3 carbon position.

* * * * *